United States Patent
Lee

(10) Patent No.: US 10,778,855 B2
(45) Date of Patent: Sep. 15, 2020

(54) SYSTEM AND METHOD FOR CREATING CONTENTS BY COLLABORATING BETWEEN USERS

(71) Applicant: LINE Corporation, Shibuya-ku, Tokyo (JP)

(72) Inventor: Il Gu Lee, Tokyo (JP)

(73) Assignee: LINE CORPORATION, Tokyo (JP)

( * ) Notice: Subject to any disclaimer, the term of this patent is extended or adjusted under 35 U.S.C. 154(b) by 7 days.

(21) Appl. No.: 15/089,954

(22) Filed: Apr. 4, 2016

(65) Prior Publication Data
US 2016/0373493 A1    Dec. 22, 2016

(30) Foreign Application Priority Data

Jun. 19, 2015   (KR) .................. 10-2015-0087706
Jul. 7, 2015    (KR) .................. 10-2015-0096827

(51) Int. Cl.
| | | |
|---|---|---|
| G06F 15/167 | (2006.01) | |
| H04N 1/00 | (2006.01) | |
| H04L 29/08 | (2006.01) | |

(52) U.S. Cl.
CPC ..... H04N 1/00156 (2013.01); H04L 67/1044 (2013.01)

(58) Field of Classification Search
CPC ................ H04L 65/4015; H04L 67/1044
USPC ........................... 709/204, 214, 216
See application file for complete search history.

(56) References Cited

U.S. PATENT DOCUMENTS

| | | | |
|---|---|---|---|
| 2005/0062844 A1 | 3/2005 | Ferren et al. | |
| 2009/0087123 A1* | 4/2009 | Izawa ............... | G06K 9/00624 382/284 |
| 2009/0327484 A1 | 12/2009 | Chen et al. | |
| 2011/0096136 A1* | 4/2011 | Liu ....................... | H04N 7/144 348/14.07 |
| 2014/0164504 A1* | 6/2014 | Dellenbach .......... | H04L 67/306 709/204 |
| 2014/0289309 A1* | 9/2014 | Mitchell, Jr. .......... | H04L 51/20 709/203 |

FOREIGN PATENT DOCUMENTS

| | | |
|---|---|---|
| CN | 103797493 A | 5/2014 |
| CN | 103858143 A | 6/2014 |

(Continued)

OTHER PUBLICATIONS

Taiwanese Office Action dated Sep. 26, 2017 issued in corresponding Taiwanese Application No. 105119055 (no English translation).

(Continued)

*Primary Examiner* — Dustin Nguyen
*Assistant Examiner* — Joel Mesa
(74) *Attorney, Agent, or Firm* — Harness, Dickey & Pierce, P.L.C.

(57) ABSTRACT

In one or more example embodiments, a method includes receiving, at a server, primary content and location information from one or more of a plurality of user devices, the location information corresponding to a location at which the primary content is created. The method further includes creating secondary content according to at least one of the primary content, the location information and additional information associated with the primary content.

19 Claims, 18 Drawing Sheets

(56) References Cited

FOREIGN PATENT DOCUMENTS

| | | |
|---|---|---|
| JP | 2003-047026 A | 2/2003 |
| JP | 2003-283994 A | 10/2003 |
| JP | 2013-541060 A | 11/2013 |
| KR | 2005-0038867 A | 4/2005 |
| KR | 2012-0004115 A | 1/2012 |
| KR | 2013-0120909 A | 11/2013 |
| TW | M491897 U | 12/2014 |
| TW | 201506645 A | 2/2015 |
| TW | M498921 U | 4/2015 |

OTHER PUBLICATIONS

Korean Office Action dated Jun. 14, 2016 issued in corresponding Korean Application No. 10-2015-0090027 (no English translation).
Chinese Office Action dated Jan. 2, 2019 issued in corresponding Chinese Application No. 201610439313.6.
Korean Office Action dated Jun. 28, 2019 issued in Korean Patent Application No. 10-2017-0049647.
Japanese Office Action dated Apr. 7, 2020, issued in corresponding Japanese Patent Application No. 2016-103798.

\* cited by examiner

Edit "first project" and provide edited first project to server 150

SYSTEM AND METHOD FOR CREATING CONTENTS BY COLLABORATING BETWEEN USERS

CROSS-REFERENCE TO RELATED APPLICATION(S)

This application claims priority under 35 U.S.C. § 119 to Korean Patent Application No. 10-2015-0087706 filed on Jun. 19, 2015, and Korean Patent Application No. 10-2015-0096827 filed on Jul. 7, 2015, in the Korean Intellectual Property Office (KIPO), the entire contents of which are incorporated herein by reference.

BACKGROUND

Field

One or more example embodiments relate to methods and systems for creating content through collaboration between users.

Description of Related Art

This section provides background information related to the present disclosure which is not necessarily prior art.

Users may create secondary content using contents created by any of the users. For example, users may create and provide a three-dimensional (3D) image by finding images taken and uploaded by individual users of the same object and synchronizing the individually taken images.

However, the process of finding and synchronizing the individually taken images entails a process of analyzing and classifying all of the individually taken images, which is computationally intensive and a result may not be specified in advance.

SUMMARY

This section provides a general summary of the disclosure, and is not a comprehensive disclosure of its full scope or all of its features.

In one or more example embodiments, a method includes receiving, at a server, primary content and location information from one or more of a plurality of user devices, the location information corresponding to a location at which the primary content is created. The method further includes creating secondary content according to at least one of the primary content, the location information and additional information associated with the primary content, and/or enabling the plurality of user devices to access to the created secondary content.

In yet another example embodiment, the method further includes creating a project for creating the secondary content based on at least one of a user request, the primary content and the location information received at the server.

In yet another example embodiment, the primary content includes images associated with content present at the location or an object designated by the project, the secondary content is at least one of a panoramic image, a three-dimensional (3D) image, and an animation image, and the creating of the secondary content includes synchronizing the images.

In yet another example embodiment, the primary content further includes a sound source or information about the sound source associated with the content, and the creating of the secondary content includes creating the secondary content by adding the sound source to the synchronized images.

In yet another example embodiment, the method further includes selecting a plurality of user devices based on at least one of location information associated with each of the plurality of users, personal relationship among the plurality of users established through a service associated with the server, and users communicating through a single communication session in a service associated with the server, and transmitting the project to the plurality of user devices in order to receive information for creating the secondary content.

In yet another example embodiment, the transmitting transmits the project to the plurality of user devices through an application executed on each of the plurality of user devices.

In yet another example embodiment, the project is a request for creating additional content that is required by the server for creating the secondary content.

In yet another example embodiment, the method further includes receiving a selection request from one or more of the plurality of user devices for the project, and transmitting the project to the one or more of the plurality of user devices having requested the project, the one or more of the plurality of user devices communicating via a communication session provided by the server.

In yet another example embodiment, the method further includes determining whether first primary content corresponding to a first one of the plurality of user devices is required for a project created for a second one of the plurality of user devices, and providing the first primary content to the second user device.

In yet another example embodiment, the project is to create the secondary content using contents that are uploaded by two or more of the plurality of user devices communicating through a communication session provided by the server, and the creating the secondary content includes creating the secondary content based on the contents provided by the two or more of the plurality of user devices.

In yet another example embodiment, the primary content includes a first image and a second image, the first image includes a first user associated with a first one of the plurality of user devices and an object, the second image includes the object and a second user associated with a second one of the plurality of user devices, and the creating the secondary content includes synthesizing the first image and the second image and creating, as the secondary content, a third image in which the first user and the second user are included.

In yet another example embodiment, the primary content includes a first image and a second image, the first image includes an object designated by the project and the second image includes a photographer of the first image, and the creating the secondary content includes synthesizing the first image and the second image and creating a third image in which the object and the photographer are included.

In yet another example embodiment, the project includes information on at least one of a place for photographing and an object, and the primary content includes at least one of an image taken at the place and an image taken from the object. The method further includes creating a recommendation for at least one of the plurality of user devices on at least one of a shooting location or a shooting angle at which at least one of the image of the place and the image of the object is to be taken, the recommendation being provided based on contents stored in a content database associated with the server, and transmitting the recommendation to the at least one of the plurality of user devices.

In yet another example embodiment, the project includes secondary content created through participation of a first one of the plurality of user devices, and the method further includes providing the project to a second one of the plurality of user devices, the second one of the plurality of user devices having set a personal relationship with the first user in a communication session provided by the server.

In yet another example embodiment, the setting the project includes receiving a project creation request from a first one of the plurality of user devices, the project creation request including the primary content and the location information, the project being transmitted to two or more of the plurality of user devices based on a relationship between locations of the two or more of the plurality of user devices and the location information received from the first one of the plurality of user devices.

In yet another example embodiment, the project includes a request for one or more of the plurality of user devices at a same geographical location over a given period, to participate in providing primary content for creation of the secondary content, and the creating the secondary content creates the secondary content based on the primary content received from the one or more of the plurality of user devices at the same geographical location that have accepted participation in the project.

In yet another example embodiment, the primary content includes images in which a place included in the project or an object designated by the project is taken at at least one of different locations and different angles, and the method further includes transmitting the project to the one or more of the plurality of user devices to request images of at least one of the place and the object, the project including information on at least one of the different locations and angles at which the images are to be captured and subsequently provided to the server for creation of the secondary content.

In yet another example embodiment, the method further includes providing the one or more of the plurality of user devices with an option to edit the project upon transmitting the project to the one or more of the plurality of user devices, and receiving an edited project from the one or more of the plurality of user devices, the edited project being the project based on which the creating the secondary content creates the secondary content.

In yet another example embodiment, the method further includes creating preliminary secondary content by extracting content corresponding to the edited project from the content database and providing the preliminary secondary content to one or more of the plurality of user devices.

In yet another example embodiment, the project is to capture one or more images of a single object at a same point in time, and the method further includes providing a shoot command in which shooting points in times are synchronized to each of the plurality of user devices participating in the project.

In yet another example embodiment, the additional information includes contents that are retrieved from a content database based on the location information associated with the primary content.

In yet another example embodiment, the method further includes extracting content from the content database based on the location information, creating a preliminary secondary content, the preliminary secondary content being a preview of the secondary content based on the extracted content and the primary content, and providing the preliminary secondary content to one or more of the plurality of user devices from which the primary content was received.

In yet another example embodiment, the primary content includes a first image in which a first user and a second user are included and a second image in which a third user is included, and the creating of the secondary content includes synthesizing the first image and the second image to create a third image in which the first user or the second user is replaced with the third user.

In yet another example embodiment, a non-transitory computer-readable recording medium includes computer-readable instructions, which when executed by a processor, cause the processor to implement the method of claim 1.

In one or more example embodiments, a server includes a memory having computer-readable instructions stored therein and a processor. The processor is configured to execute the computer-readable instructions to receive primary content and location information from one or more of a plurality of user devices, the location information corresponding to a location at which the primary content is created, create secondary content according to at least one of the primary content, the location information and additional information associated with the primary content, and/or enable the plurality of user devices to access to the created secondary content.

In yet another example embodiment, the processor is further configured to execute the computer-readable instructions to create a project for creating the secondary content based on at least one of a user request and the primary content and the location information received at the server.

In yet another example embodiment, the primary content includes images associated with content present at the location or an object designated by the project, the secondary content is at least one of a panoramic image, a three-dimensional (3D) image, and an animation image, and the processor is configured to execute the computer-readable instructions to create the secondary content by synchronizing the images.

In yet another example embodiment, the processor is further configured to execute the computer-readable instructions to select a plurality of user devices based on at least one of location information associated with each of the plurality of users, personal relationship among the plurality of users established through a service associated with the server, and users communicating through a single communication session in a service associated with the server, and transmit the project to the plurality of user devices in order to receive information for creating the secondary content.

In yet another example embodiment, the additional information includes contents retrieved from a content database based on the location information associated with the primary content.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
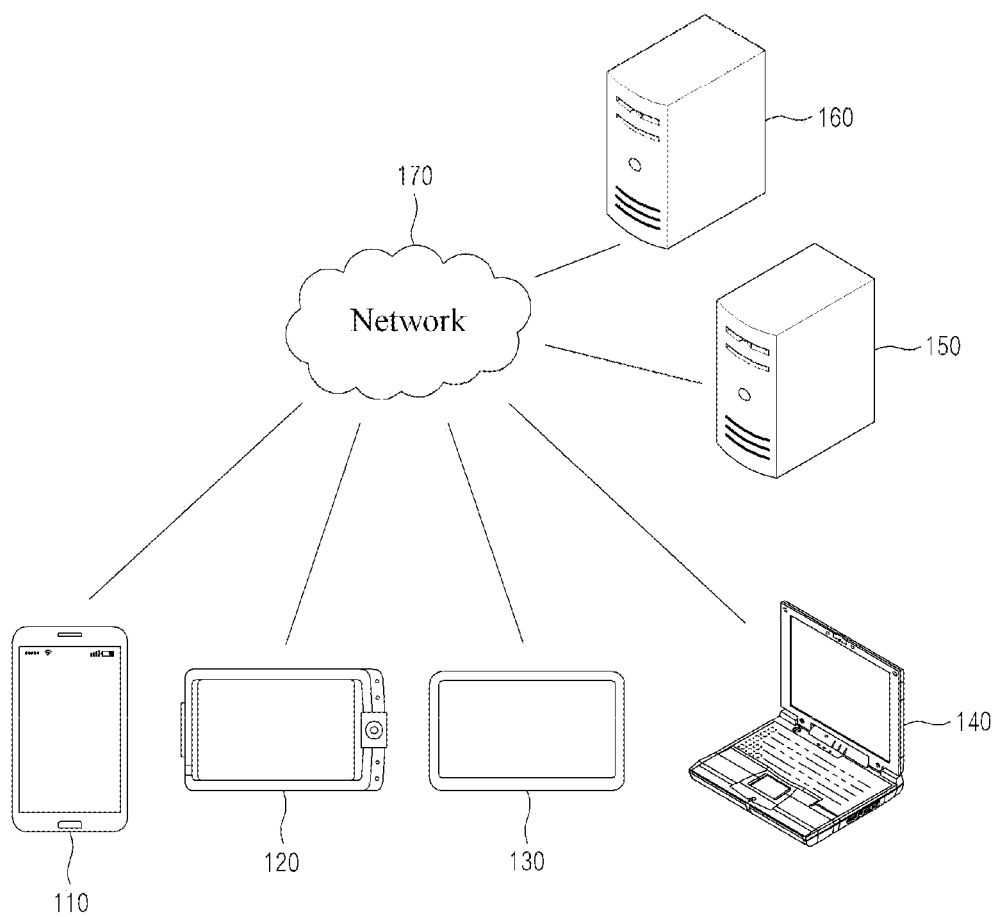
FIG. 1 is a diagram illustrating an operating environment of a system for creating secondary content, according to an example embodiment.

It should be noted that these figures are intended to illustrate the general characteristics of methods and/or structure utilized in example embodiments and to supplement the written description provided below. These drawings are not, however, to scale and may not precisely reflect the precise structural or performance characteristics of example embodiment, and should not be interpreted as defining or limiting the range of values or properties encompassed by example embodiments.

DETAILED DESCRIPTION OF EXAMPLE EMBODIMENTS

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

FIG. 1 is a diagram illustrating an operating environment of a system for creating secondary content, according to an example embodiment. FIG. 1 illustrates a plurality of electronic devices 110, 120, 130, and 140, a plurality of servers 150 and 160, and a single network 170 as example elements of the operating environment.

The electronic devices 110, 120, 130, and 140 may be a fixed terminal or a mobile terminal configured through a computing system. Examples of the electronic devices 110, 120, 130, and 140 may be any one of, but is not limited to, a smartphone, a mobile phone, a navigation device, a computer, a laptop, a digital multimedia broadcasting (DMB) terminal, a personal digital assistant (PDA), a portable multimedia player (PMP), a tablet personal computer (PC), etc. Each of the electronic devices 110, 120, 130, and 140 may communicate with other electronic devices and/or the servers 150 and 160 over the network 170 using a wireless and/or wired communication method(s).

A communication method may include, but is not limited to, a communication method capable of using a communication network, for example, a mobile communication network, the wired Internet, the wireless Internet, a broadcasting network, etc., includable in the network 170, and a near-field wireless communication between devices. The network 170 may include at least one type of network including, but not limited to, a personal area network (PAN), a local area network (LAN), a campus area network (CAN), a metropolitan area network (MAN), a wide area network (WAN), a broadband network (BBN), the Internet, etc. Also, the network 170 may include at least one of network topologies including a bus network, a star network, a ring network, a mesh network, a star-bus network, a tree or a hierarchical network, etc.

Each of the servers 150 and 160 may be configured as a single apparatus or a plurality of apparatuses that provide contents for a service through communication with the electronic devices 110, 120, 130, and/or 140 over the network 170. For example, the servers 150 and/or 160 may provide a code capable of configuring a screen of each of the electronic devices 110, 120, 130, and 140 in response to a request from a user. The electronic devices 110, 120, 130, and/or 140 may provide content to the user by configuring the screen using the code through a program, for example, a browser or a specific application included in the electronic devices 110, 120, 130, and/or 140.

Also, according to one or more example embodiments, the electronic devices 110, 120, 130, and/or 140 may download and store in advance data required to provide a service through the servers 150 and/160, may create content for the service using stored data and data of the electronic devices 110, 120, 130, and/or 140, for example, data input from the user or data measured by the electronic devices 110, 120, 130, and/or 140, and may provide the created content to the user.

Figure 2:
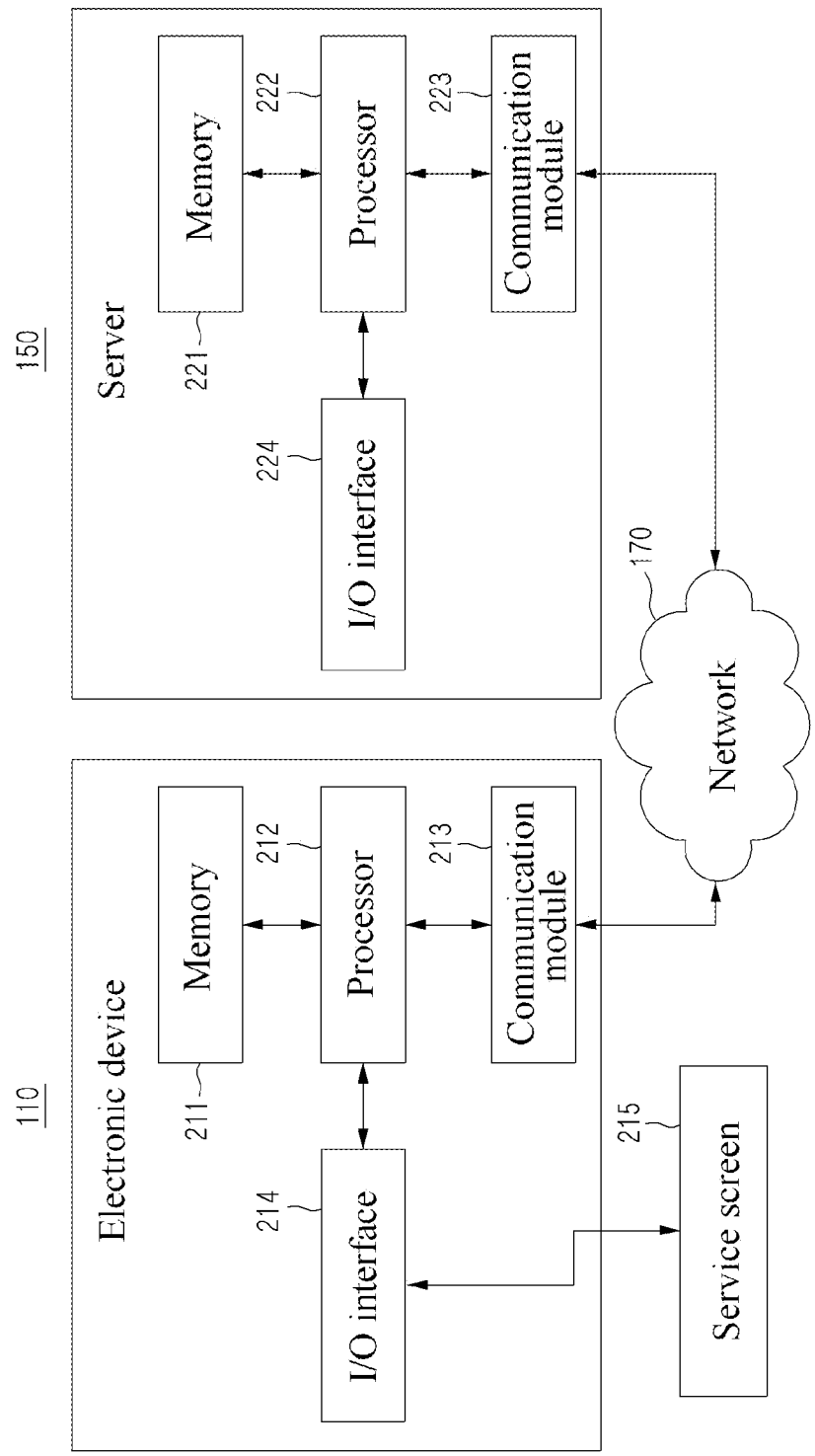
FIG. 2 is a block diagram illustrating a configuration of an electronic device and a server, according to an example embodiment.

FIG. 2 is a block diagram illustrating a configuration of an electronic device and a server, according to an example embodiment.

The electronic device 110 and the server 150 may include memories 211, 221, processors 212 and 222, communication modules 213 and 223, and input/output (I/O) interfaces 214 and 224, respectively. Each of the memories 211 and 221 may include a permanent mass storage device, such as a random access memory (RAM), a read only memory (ROM), a disc drive, a solid state drive, an optical drive, etc., as a computer-readable storage medium. Also, each of the memories 211 and 221 may store an operating system (OS) and at least one program code (e.g., an instruction for an application installed and executed on the electronic device 110). Such software constituent elements may be loaded from another computer-readable storage medium separate from the memories 211 and 221 using a drive mechanism (not shown). The other computer-readable storage medium may include, for example, a floppy drive, a disc, a tape, a DVD/CD-ROM drive, a memory card, etc. Software constituent elements may be loaded to the memories 211 and 221 through the respective one of the communication modules 213 and 223 instead of, or in addition to, the computer-readable storage medium. For example, at least one program may be loaded to the memories 211 and 221 based on a program installed by files that are provided from developers through the network 170.

Each of the processors 212 and 222 may be configured to process computer-readable instructions of a computer program by performing a basic arithmetic operation, a logic operation, and/or an input/output operation. The computer-readable instructions may be provided from the memories 211 and 221 and/or the network interfaces 213 and 223 to the processors 212 and 222, respectively. The processors 212 and 222 may be configured to execute program codes stored in a storage device such as the memories 211 and 221 (e.g., the computer-readable instructions).

The communication modules 213 and 223 may provide a function for communication between the electronic device 110 and the server 150 over the network 170, and may provide a function for communication between the electronic device 110 or the server 150 and another electronic device or another server. For example, a request message created at the processor 212 of the electronic device 110 under control of the user may be transferred to the server 150 over the network 170 under control of the communication module 213. Inversely, content provided from the processor 222 of the server 150 may be received through the communication module 213 of the electronic device 110 over the communication module 223 and the network 170, and be transferred to the processor 212 or the memory 211.

The I/O interfaces 214 and 224 may be used for interface with a variety of input devices and output devices. For example, the input devices may include devices such as a keyboard, a mouse, etc., and the output devices may include devices such as a display for displaying an application and a communication session of the application, etc. As another example, the I/O interfaces 214 and 224 may be used for interface with an apparatus in which an input function and an output function are integrated into a single function, such as a touch screen, etc.

In detail, for example, the processor 211 of the electronic device 110 may be configured so that a service screen 215 configured based on data provided from the server 150 may be displayed through the I/O interface 214 when processing computer program instructions loaded to the memory 211.

Further, according to one or more example embodiments, the electronic device 110 and the server 150 may include a greater or lesser number of constituent elements than the number of constituent elements shown in FIG. 2. For example, the electronic device 110 may include other constituent elements such as a display or a transceiver, a global positioning system (GPS) module, a camera, etc.

Figure 3:
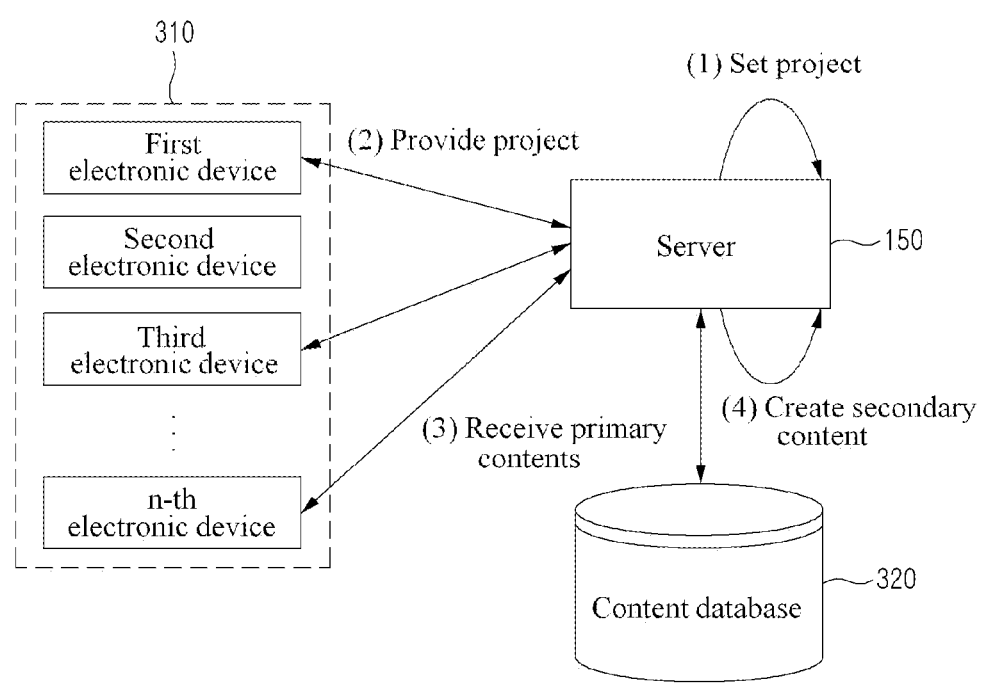
FIG. 3 is a diagram illustrating a process of creating secondary content, according to an example embodiment.

FIG. 3 is a diagram illustrating a process of creating secondary content, according to an example embodiment. FIG. 3 illustrates the server 150 and a plurality of electronic devices 310. The first through the n-th electronic device of the plurality of electronic devices 310 may correspond to the electronic devices 110, 120, 130 and/140 shown in FIG. 1 (in case when n is equal to 4) and/or any other type of electronic devices. Hereinafter, a process of creating the secondary content in perspective of the server 150 will be briefly described.

In process (1), the server 150 may create (set) a project. For example, the server 150 may create a project for creation of the secondary content. The project may include information about primary contents that are to be created by users in order to create the secondary content. The server 150 may set or create the project in response to a request from a specific user (associated with one or more of the plurality of electronic devices 310). The server 150 may automatically set or create the project by analyzing contents received at and/or obtained by the server 150.

For example, the server 150 may obtain information about contents stored in a content database 320 by including and thereby directly managing the content database 320 or by communicating with the content database 320 constructed outside the server 150 over a network. Each of the contents received from the plurality of electronic devices 310 and a location associated with creation thereof may be stored in association with one another in the content database 320. For example, an application associated with a service provided from the server 150 may be installed in each of the plurality of electronic devices 310. When each of the plurality of electronic devices 310 creates content and transmits the created content to the server 150 under control of the application, the application may verify GPS coordinate information of a corresponding electronic device in creating the content and transmit the verified GPS coordinate information to the server 150 together with the content. The server 150 may store the received content and GPS coordinate information in the content database 320 to correspond to each other. Here, the server 150 may create a project (which may also be referred to as a mission or a task) associated with a specific location by analyzing contents stored in correspondence to the specific location. For example, in a photo spot of a famous tourism site, many users may take photos of a famous object such as a statue, etc., at the tourism site and may upload the photos to a social networking service (SNS) server. The SNS server may transfer a project or a mission for instructing people, for example, ten people, passing by the place to take a photo of the object at different angles at preset time intervals based on uploaded information, using a messenger chat room, etc.

As another example, the server 150 may receive a project setting request from a user and may create a project in response to the received project setting request. The application installed and executed on each of the plurality of electronic devices 310 may control the corresponding electronic device 310 to provide a user interface for inputting or selecting a project setting condition. The electronic device 310 may transmit the project setting request to the server 150 under control of the application in such a manner that the user inputs or selects a desired project setting condition using the user interface.

In process (2), the server 150 may provide (transmit) the project. For example, the server 150 may provide (transmit) the set project to one or more of the plurality of electronic devices 310, for example, a first electronic device, a third electronic device, and an n-th electronic device in FIG. 3, associated with the set project.

The ones of the plurality of electronic devices 310 to be provided with the set project may be selected using a variety of methods. For example, the server 150 may provide the project to ones of the plurality of electronic devices 310, where the user(s) associated with the ones of the plurality of devices 310 have selected the set project, are selected by the server 150 (for example, based on the associated user(s) being located at or near the same geographical location based on location information provided from the plurality of electronic devices 310), have set a personal relationship in a service, for example, an SNS, associated with the server 150, and/or are communicating through a single communication session, for example, a chat room, in a service associated with the server 150, etc.

In process (3), the server 150 may receive primary content. For example, the primary content may be created at each of the electronic devices, for example, the first electronic device, the third electronic device, and the n-th electronic device in FIG. 3, according to the set project and may be transmitted to the server 150. Here, the server 150 may receive the primary content transmitted from each of the electronic devices.

In detail, for example, the project may include information about a specific place or a specific object, and the primary content may include an image taken at the specific place or an image taken to include the specific object. In this example, the server 150 may request, as part of the project, the selected user(s) to capture an image of the specific place or the specific object. The user(s) may capture the requested image(s) through the project as the primary content and may transmit the taken image(s) to the server 150 through the corresponding ones of the plurality of electronic devices 310.

In process (4), the server 150 may create the secondary content. For example, the server 150 may create a 3D image or an animation image, a panoramic image, etc., of the specific place or the specific object as the secondary content by synchronizing the images received as the primary contents. For example, when photos of a specific building are taken at different angles simultaneously or at different points in time using a plurality of cameras, the server 150 may synchronize the taken photos and may create a 3D image giving an effect as if a viewer is viewing a moving picture rotating providing the viewer with a 360 degrees view of the building, according to known and/or to be developed methods. Furthermore and in one or more example embodiments, when a plurality of users take photos of distant objects such as mountains at different angles, the server 150 may create a panoramic photo of the distant object by connecting the taken photos, according to known and/or to be developed methods. In one or more example embodiments, one or more of the plurality of electronic devices 310 are then able to access the created secondary content.

In one or more example embodiments, a single user may request a project at a specific place by himself or herself and may perform a mission (e.g., capturing an image) at every angle. Also, a plurality of users may individually carry out an assigned mission, such as taking a photo or a video, at instructed angles and at instructed locations at individually convenient instances as opposed to performing the assigned mission simultaneously.

Furthermore and in one or more example embodiments, in which friends go on a picnic at a specific location (e.g., a park, a concert, etc.), the friends may request the server 150 to create a project among one or more of the friends attending the picnic and/or any additional user/friend not present at the picnic). The friends may assign a shooting place and their own shooting angles, etc., and may take a photo at the assigned locations. In addition, when taking a photo in response to an assigned mission, a user interface (UI) that displays an individual's shooting location in a pin form on a display may be displayed on a screen. The primary contents may also include drawings directly drawn by users, text information, etc., in addition to the taken images/videos. For example, the secondary content may be created by connecting the drawings directly drawn by one or more of the friends. A document that describes specific technology, object, etc. may be created as the secondary content by combining text information.

In addition, when the primary content are still images (photos), a plurality of photos may be synchronized and another type of primary content, for example, a sound source such as background music, a voice, etc., may be added thereto by the server 150. For example, the server 150 may make a unilateral selection of the background music and the secondary content may be created by adding the background music using a sound source selected by the user. In this case, the project may include information for instructing users to draw a specific portion of the entire picture or to transmit text information including explanation about specific technology or object to the server 150.

In one or more example embodiments, when a plurality of users simultaneously take photos, a scene in which another user is taking a photo may be displayed as a small screen. In this case, a shooting location of the other user may be instructed to be adjusted through a chat window or a map on which a current location and a target location of a counter party are marked.

As described above, the server 150 may predict a result to be created by setting the project for the secondary content to be created, by assigning the project to selected users in a form of a mission, and/or by creating the secondary content through primary content that are created according to the project, as described above. The server 150 may create the secondary content using the primary content received according to the project without analyzing all of the contents received at the server 150 to create a single item of secondary content. Accordingly, it is possible to reduce the computational intensity/requirement, as mentioned in the Background Section of the present application.

Figure 4:
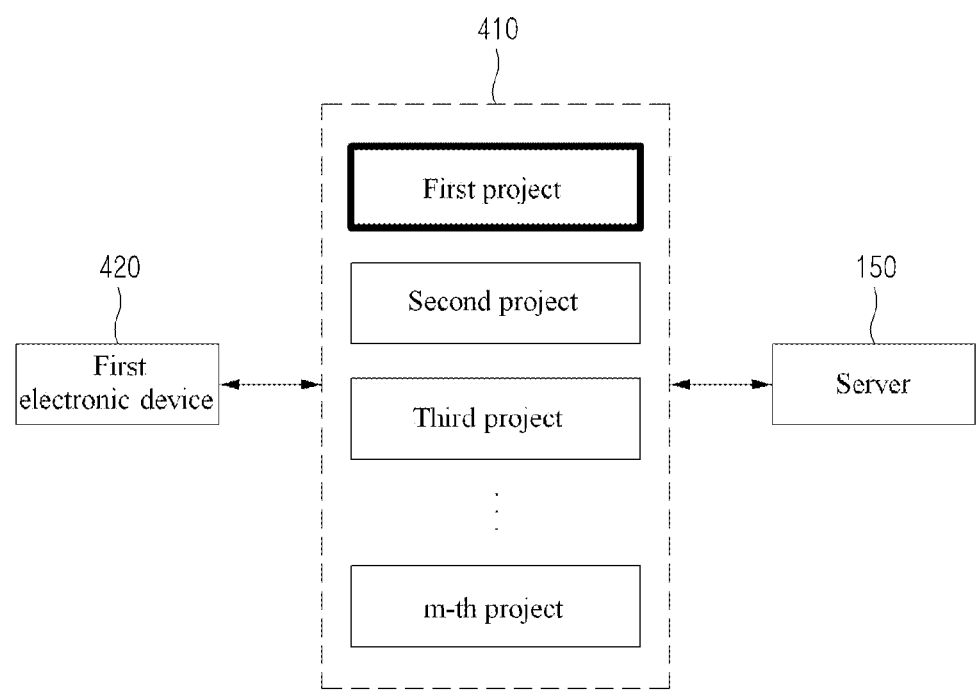
FIG. 4 is a diagram illustrating an example of assigning a project to a user, according to an example embodiment.

FIG. 4 is a diagram illustrating an example of assigning a project to a user, according to an example embodiment. The server 150 may set and maintain a plurality of projects 410. Here, a first electronic device 420 (which may correspond to any one of the plurality of devices 310 shown in FIG. 3) may receive information about the plurality of projects 410 from the server 150 and may select a desired project from among the plurality of projects 410 under control of an application installed and executed, via a processor, on the first electronic device 420. For example, a user of the first electronic device 420 may select a "first project" from among the plurality of projects 410 as the desired project. In this case, the server 150 may instruct the user to create and transmit primary content by providing the selected "first project" to the first electronic device 420. Here, the "first project" may include information for instructing the user of the first electronic device 420 to create and transmit primary content for secondary content desired to be created through the "first project". For example, when an image taken at a specific angle is absent in creating a 3D image of a specific object, information for instructing the user to capture the image at the specified angle may be included in the "first project". That is, information for requesting the user to provide content for the "first project" selected by the user may be communicated to the first electronic device 420 and ultimately to the user of the first electronic device 420.

Figure 5:
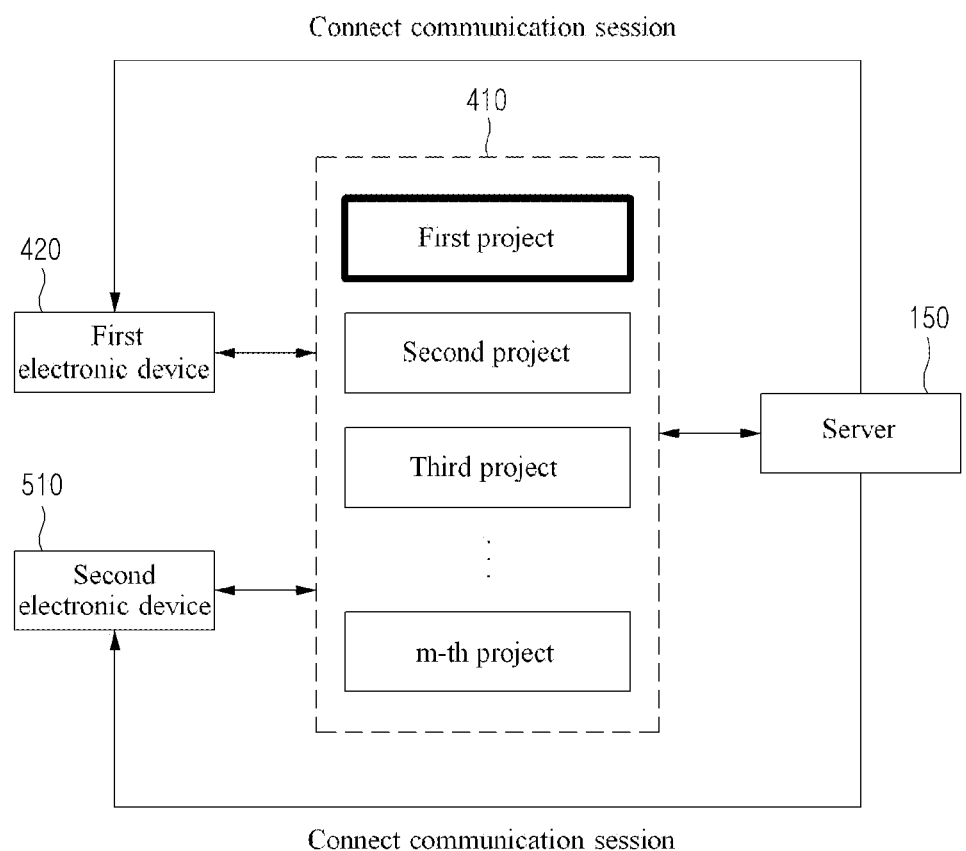
FIG. 5 is a diagram illustrating an example of assigning a project to a user, according to an example embodiment.

FIG. 5 is a diagram illustrating an example of assigning a project to a user, according to an example embodiment. In describing FIG. 5, as assumption is made that after the first electronic device 420 has selected the "first project" in FIG. 4, a second electronic device 510 (which may correspond to any one of the plurality of devices 310 shown in FIG. 3) has also selected the "first project" using the same method, as described above with reference to the first electronic device 420 in FIG. 4. Here, the server 150 may establish/facilitate a communication session between the first electronic device 420 and the second electronic device 510, and may group the user of the first electronic device 420 and a user of the second electronic device 510 into a group that proceeds with the same project. For example, the server 150 may create a chat room in which the user of the first electronic device 420 and the user of the second electronic device 510 participate and may provide a chat service between the two users. To this end, an application installed and executed, via a corresponding processor, on the first electronic device 420 and an application installed and executed, via a corresponding processor, on the second electronic device 510 may include a function for providing at least a chat service between the users of the first electronic device 420 and the second electronic device 510.

In one or more example embodiments, if an electronic device, in addition to the first electronic device 410 and the second electronic device 510, selects the "first project", a group chat service for all the participating electronic devices (e.g., first, second and the additional electronic devices) may be provided by the processor 150.

Users may select different projects or may not select any project at all. For example, when another electronic device selects a "second project", the server 150 may recommend the "first project" selected by a plurality of users (e.g., the first and second electronic devices 410 and 510 in example embodiments described above). As another example, the server 150 may support collaboration between users for the "first project" by recommending the "first project" selected by the plurality of users to electronic devices of users who have not selected a project yet.

Figure 6:
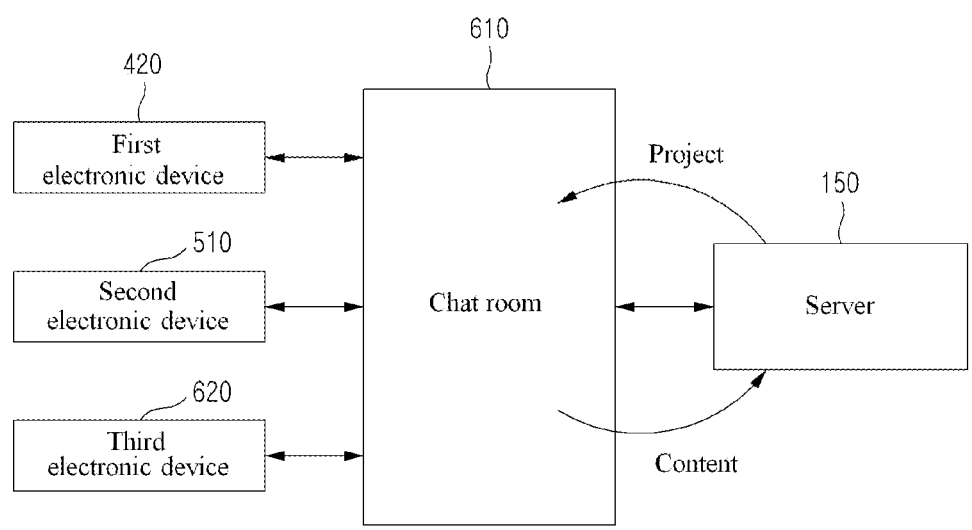
FIG. 6 is a diagram illustrating an example of assigning a project to a user, according to an example embodiment.

FIG. 6 is a diagram illustrating an example of assigning a project to a user, according to an example embodiment. FIG. 6 illustrates an example of providing, through a chat room 610, a chat service to the first electronic device 420, the second electronic device 510, and a third electronic device 620 (which may correspond to any one of the plurality of devices 310 shown in FIG. 3) that are connected to the chat room 610 through a communication session.

In FIG. 6, the server 150 may create/set a project for users of the first electronic device 420, the second electronic device 510, and the third electronic device 620, and may provide the set project to the first electronic device 420, the second electronic device 510, and the third electronic device 620. The user(s) of the first electronic device 420, the second electronic device 510 and the third electronic device 620 may create contents according to the project and may upload the contents to the server 150 through the chat room 610, and the server 150 may create secondary content using the contents uploaded through the chat room 610.

In FIG. 6, the server 150 may create the secondary content by collecting contents arbitrarily uploaded to the chat room 610 by the user(s) of the first electronic device 420, the second electronic device 510 and the third electronic device 620. For example, the server 150 may create/set a project for creating the secondary content using the contents uploaded to the chat room 610. Here, the project that includes guide information about such automatic creation of the secondary content may be provided by the server 250 to the first electronic device 420, the second electronic device 510, and the third electronic device 620 through the chat room 610. Here, the users of the first electronic device 420, the second electronic device 510 and the third electronic device 620 may have no particular intent to create the secondary content. However, the server 150 may automatically create the secondary content using the contents uploaded through the chat room 610, and may provide the created secondary content to the users of the first electronic device 420, the second electronic device 510, and the third electronic device 620 through the chat room 610. For example, friends having traveled together may transfer photos taken at a tourism spot to each other while chatting about the travel in the chat room 610. In this example, the server 150 may automatically create the secondary content, such as a slide show, an animation, etc., by mixing the uploaded photos and may provide the created secondary content to the users through the chat room 610.

In FIG. 6, the project may include information for receiving a confirmation from users regarding whether to allow automatic creation of the secondary content. Here, if user(s) of one or more of the first electronic device 420, the second electronic device 510 and the third electronic device 620 connected to the chat room 610 allows the automatic creation of the secondary content, the secondary content may be automatically created by the server 150 using contents uploaded to the chat room 610.

Figure 7:
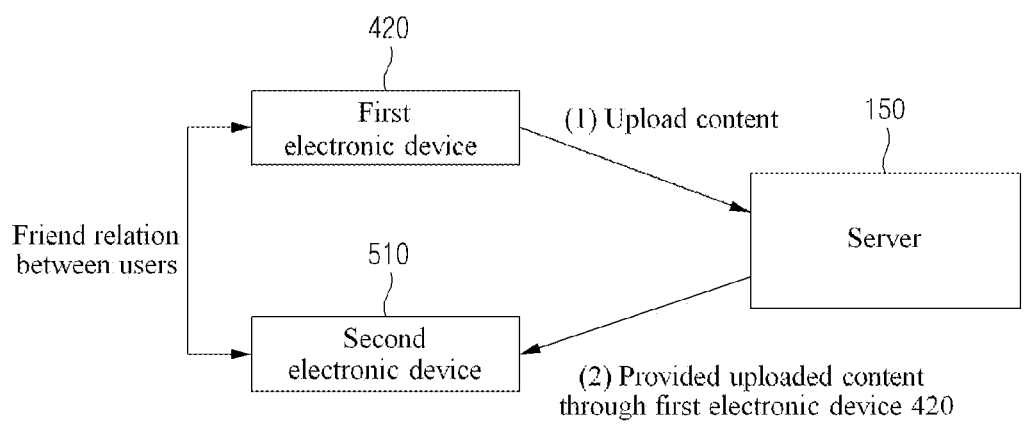
FIG. 7 is a diagram illustrating an example of assigning a project to a user, according to an example embodiment.

FIG. 7 is a diagram illustrating an example of assigning a project to a user, according to an example embodiment. When a personal relationship is present between the user of the first electronic device 420 and the user of the second electronic device 510, the server 150 may provide content uploaded through the first electronic device 420 to the second electronic device 510. For example, when the user of the first electronic device 420 uploads an image taken at a place A to the server 150 and then the user of the second electronic device 510 visits the place A and a current location of the second electronic device 510 is determined as the place A, the server 150 may provide the image taken at the place A by the user of the first electronic device 420 to the second electronic device 510. That is, the server 150 may inform the user of the second electronic device 510 that the user of the first electronic device 420 has visited the place A and thus provides the user of the second electronic device 510 with one or more pictures of place A taken and uploaded via the first electronic device 420 by the corresponding user.

In at least one example embodiment, the server 150 may provide content uploaded using the first electronic device 420 and via a chat room accessed by the user of the first electronic device 420 and the user of the second electronic device 510. Accordingly, the server 150 enables the two users of the first electronic device 420 and the second electronic device 510 to chat about the uploaded content, for example, the place A.

In at least one example embodiment, the server 150 may obtain a permission from the user of the first electronic device 420 regarding whether to provide the content uploaded through the first electronic device 420 to the second electronic device 510 via the chat room and hence share the uploaded content.

As described above, the server 150 may provide a service that enables a first user of a first electronic device to upload and share content in connection with an activity, such as visual content (pictures) created in connection with an outdoor activity, with a second user of a second electronic device with whom the first user has a personal relationship (e.g., friendship) stored in the memory 221 of the server 150.

In at least one example embodiment, a relationship between two users may not exist. Nevertheless, the server 150 may recommend a shooting location to a user while providing the primary contents created by other users at the same shooting location desired by the user or the secondary content.

Figure 8:
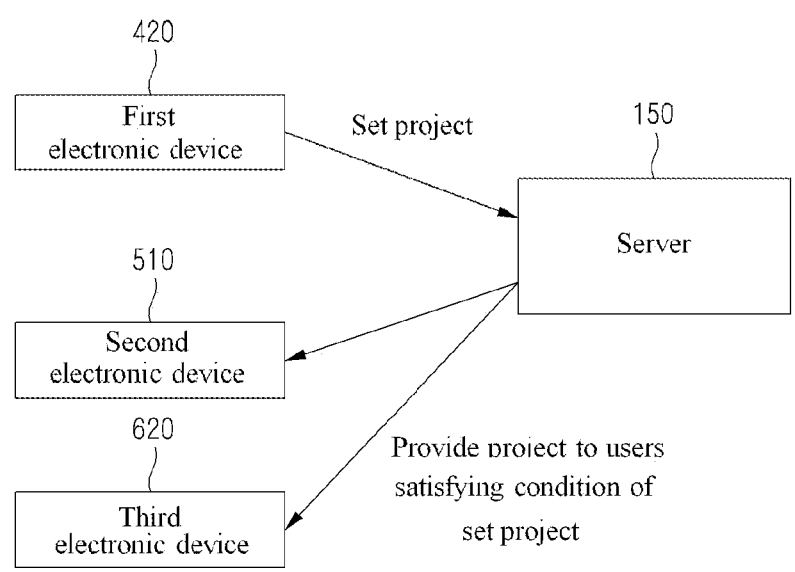
FIG. 8 is a diagram illustrating an example of assigning a project to a user, according to an example embodiment.

FIG. 8 is a diagram illustrating an example of assigning a project to a user, according to an example embodiment. The user of the first electronic device 420 may directly create a project through a function provided from an application executed, via a processor, on the first electronic device 420. The server 150 may register the project created by the user of the first electronic device 420, and may provide the project to user(s) of other electronic devices such as the user of the second electronic device 510 and/or the user of the third electronic device 620, satisfying a condition of the set project and may request the users of the other user(s) to participate in a mission (e.g., a project of creating a 3D model from individual images of an object taken by users of the electronic devices 420, 510 and 620).

As an example, the user of the first electronic device 420 may witness a specific incident or accident, such as an event, a festival, a natural disaster, a traffic accident, etc. The user of the first electronic device 420 may then create a project for taking an image associated with the specific incident or accident, and may register the created project to the server 150. Here, the project may include a location associated with the specific incident or accident. In this case, the server 150 may provide the project to other users, for example, the user of the second electronic device 510 and the user of the third electronic device 620, present in a place corresponding to the location included in the project, and may request the other users to take an image associated with the specific incident or accident and to upload the taken images to the server 150.

As another example, the server 150 may request an input of text information associated with the specific incident or accident in addition to the requested image(s), according to a setting of the project.

When contents are uploaded from the second electronic device 510 and the third electronic device 620, the server 150 may create secondary content using the contents of the first electronic device 420, the second electronic device 510, and the third electronic device 620.

Figure 9:
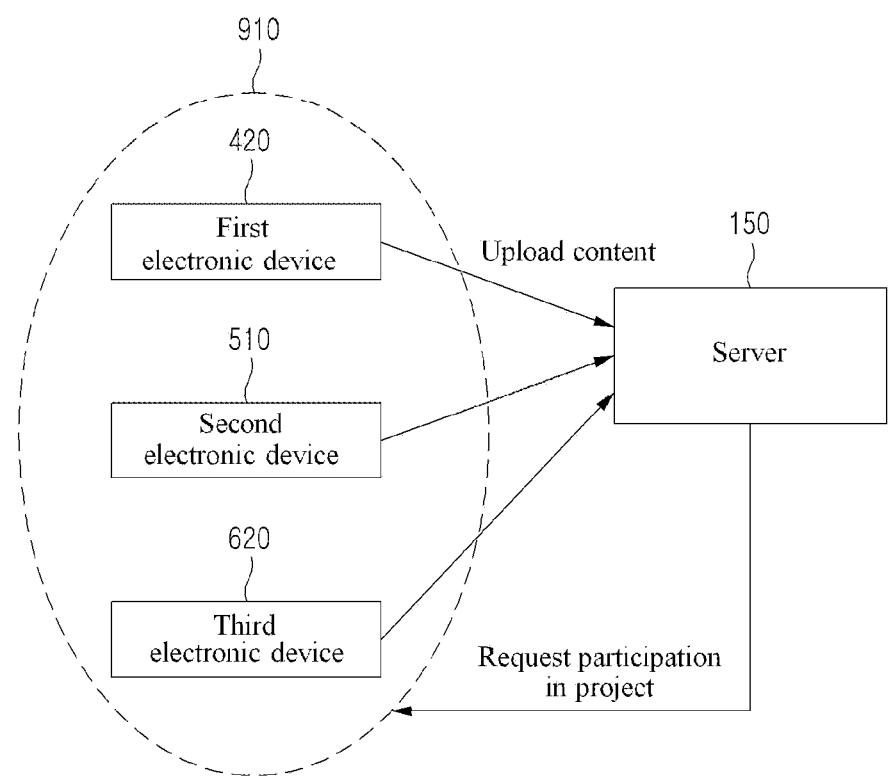
FIG. 9 is a diagram illustrating an example of assigning a project to a user, according to an example embodiment.

FIG. 9 is a diagram illustrating an example of assigning a project to a user, according to an example embodiment. FIG. 9 illustrates an example in which the server 150 request users, for example, the users of the first electronic device 420, the second electronic device 510, and the third electronic device 620, having uploaded contents to the server 150 at a specific place (location) indicated with a dotted circle 910, to participate in a project. Here, the server 150 may set a communication session between users allowing the participation of the users via their respective electronic device (420, 510 and/or 620) in the project. For example, the server 150 may connect the users to a single chat room and may create secondary content using contents uploaded by the users connected through the communication session and the chat room. Moreover, the server 150 may provide the created secondary content to the users connected through the set communication session.

For example, when a plurality of users create images at a point in time and at a place at which a specific incident or accident has occurred and upload the created images to the server 150, the server 150 may connect the users via a single chat room, may create secondary content about the specific incident or accident using the images uploaded by the users, and may distribute the created secondary content through the chat room. If the uploaded primary contents such as images and/or text information, etc., are insufficient for creating the secondary content (e.g., there is at least one missing primary content), the server 150 may request another user present at the place and/or the users of the chat room to add the missing primary content. That is, the server 150 may create/set a project, for example, a project for the missing primary content based on locations of the uploaded contents, provide the project to users communicating through the single communication session (for example, the chat room) or users selected by the server 150, and request the users to create and provide/upload the missing primary content to the server 150.

Figure 10:
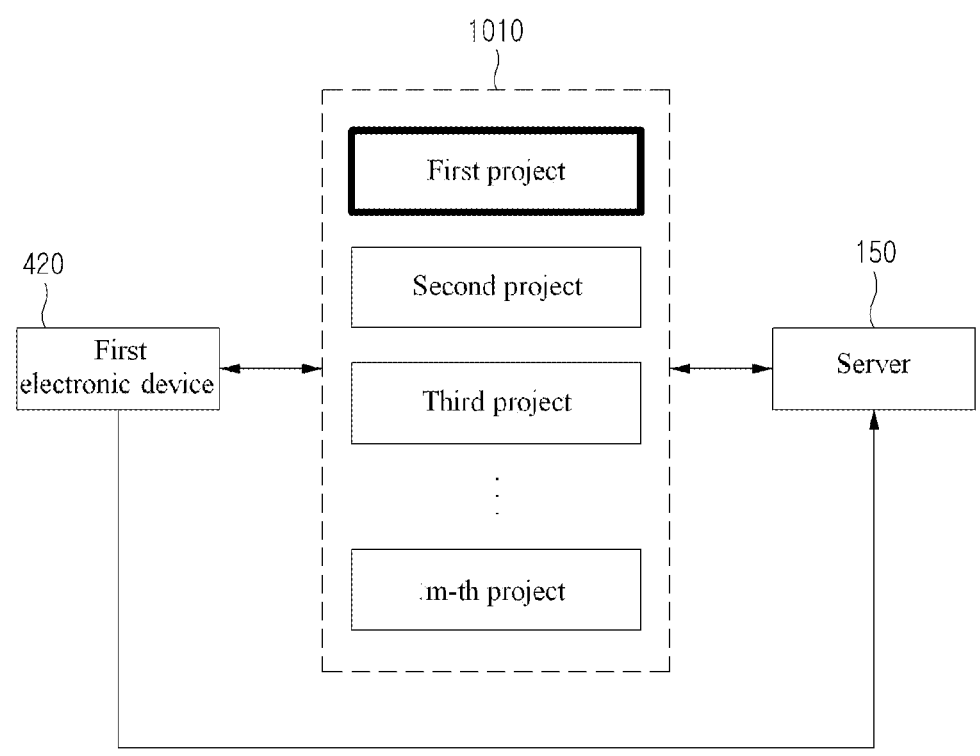
FIG. 10 is a diagram illustrating an example of a process of editing a project, according to an example embodiment.

FIG. 10 is a diagram illustrating an example of a process of editing a project, according to an example embodiment. Similar to FIG. 4, the server 150 may provide a plurality of set projects 1010 to the first electronic device 420. The user of the first electronic device 420 may select a desired project, for example, a first project. Here, the user of the first electronic device 420 may edit the selected project using a function of the application installed and executed, via the processor, on the first electronic device 410. The edited project may be provided to the server 150 and may be registered as a new project. In this case, the user of the first electronic device 420 may conveniently set a customized project by editing a preset project rather than planning, creating, and registering the project from scratch.

As an example of customizing/editing a present project by the user of the first electronic device 420, the server 150 may initially provide the user of the first electronic device 420 with a project of creating secondary content using images taken from a single object by ten users at different angles. Upon receiving the project from server 150, the user via the first electronic device 420 may edit the project by increasing the number of users from 10 to 15 users, replacing the object with another object, etc.

When a user edits a project, the server 150 may create predicted content (which may alternatively be referred to as the preliminary secondary content) for the edited project and may transmit the predicted content to the first electronic device 420. The server 150 may extract content suitable for a condition of the project from a content database, for example, the content database 320 of FIG. 3, and the predicted content may be created from the extracted content. For example, when specific secondary content taken and created at a specific location is stored in the server 150, the specific secondary content may be provided to project participants in a preview form so that the project participants may individually use the specific secondary content as a reference material to determine a shooting location/angle or to edit the project as they see fit.

The predicted content may be created by the server 150 when a user, via a respective electronic device, creates primary content according to the project. For example, when the user of the first electronic device 420 creates the primary content according to the project and transmits the primary content to the server 150, the server 150 may create and provide the predicted secondary content using other contents, which satisfy a condition of the project, retrieved from a content database and the primary content irrespective of whether the primary content and/or the other contents for creating the secondary content are sufficient or not.

Hereinafter, examples of creating secondary content using images uploaded as primary contents will be described. A description relating to electronic devices of users will be omitted here. However, it will be understood by one of those skilled in the art that communication between a user, via a respective electronic device, and the server 150 is enabled through an electronic device of the user.

For example, a user A may take a first image in which an object designated by a project and a user B are included, and the user B may take a second image in which the object designated by the project and the user A are included. The user A and the user B may upload the first image and the second image to the server 150. In this example, the server 150 may synthesize (according to known and/or to be developed methods) the first image and the second image, and may create a third image in which the user A, the user B, and the object are included, as the secondary content. In this case, the user A and the user B may obtain an image, for example, the third image in which both of the user A and the user B are included, even though no other image was taken by any other user via any other electronic device that includes users A and B.

As another example, the server 150 may create, as the secondary content, a third image in which the user A or the user B is replaced with a user C using a first image in which the user A and the user B are included and a second image in which the user C is included (the second image may be retrieved from the content database 320).

As another example, the server 150 may provide users present at the same place, with a project for setting a specific user as an object and instructing the specific user set as the object to perform a specific action, for example, the specific action of jumping. In this example, the project may further include information for instructing remaining users to take a photo of the specific user set as the object at different angles or locations. When images of the specific user taken at different angles or locations are uploaded to the server 150, the server 150 may create the secondary content about the specific user set as the object, using the uploaded images.

Further, the server 150 may provide a tick synchronization function when users simultaneously take a photo of an object via their respective electronic device, or may provide the users with a function of correcting camera settings on their respective electronic device to correct different distances using an automatic zoom-in, etc., when distances between the object and the respective electronic device of any of the users are different. The functions may be processed by controlling each of the electronic devices through an application installed and executed, via a processor, on the electronic device in response to instructions provided from the server 150.

For example, if users directly manipulate their respective electronic device to press a take-a-photo button, in a mission in which the users are asked to simultaneously take a photo of an object, it would be difficult to implement the simultaneous taking of the photo of the object. Accordingly, the server 150 may transmit a command in which shooting points in times are synchronized to electronic devices of the users so that the electronic devices of the users may start taking a photo simultaneously, for example, within a time difference of 0.01 second. Here, the electronic devices may take a photo at the same point in time in response to the command received from the server 150, and images simultaneously taken from the object may be obtained. Alternatively, the server 150 enables users participating in the mission to take a video at preset locations. Here, the server 150 may control the electronic devices of the users to extract a still image corresponding to a specific point in time from the video and to provide the extracted still image to the server 150.

Further, the server 150 may measure an azimuth, a location, etc., through an image recognition, may synchronize a time between primary contents through a voice recognition function, a video recognition function, etc., and may correct a blur through a motion recognition or create a 3D sound source and may include the blur-corrected image or the 3D sound source in the secondary content, all through respective known or to be developed methods.

In one or more example embodiments, a video as well as a still image is used as primary content. Secondary content may be an image to which a hand shake correction, a high dynamic range (HDR), 60 fps video, GIF animation, 360-degree camera image, a zoom, a camera rotation effect, etc., are applied. For example, an image shaken/blurred by a hand shaking may be corrected using another similar image. Also, a slow video effect may be provided by combining frames with respect to at least a portion of videos taken using a plurality of cameras.

Further, content completed by predicting and supplementing an intermediate frame corresponding to an empty location/angle at which a photo is not taken may be included. Images having different attributes at a time of photographing may be integrated. For example, in the case of night photographing, secondary content may be produced by integrating images each in which a background with light is photographed at a relatively low exposure and thus, appears dark and an object is photographed at a relatively high exposure and thus, appears clear. This corresponds to an HDR effect.

Furthermore, the secondary content may be produced so that a person stands out over a background due to a diaphragm difference. Also, the secondary content, in case the secondary content is a video, may be produced so that a beginning part plays as a slow video and a last part plays at an original speed by combining videos taken using a plurality of cameras. Further, when photographing is performed using different types of cameras, correction may be performed to synchronize/match mutual characteristics of the different photographs taken using different types of cameras. In addition, the server 150, using known or to be developed methods, may erase an obstacle included in an image using another image or correct a blurred portion using another image.

Hereinafter, an example of a function of an application installed and executed on an electronic device of a user will be described.

For example, when a project includes a mission of taking a photo at a specific angle or location, the application may include a function for providing information for a user to take the angle or the location. That is, the application may provide the user with information indicating a direction toward which the user is to move, for example, marking a direction or a target on a camera screen of the electronic device of the user.

As another example, the application may provide the user with information about a subsequent shooting angle or location when the user is to create an image by taking a photo at the specific angle or location.

As another example, the application may provide the user with information about content to be added to contents uploaded so far to the server 150 in order to create the secondary content. For example, when an image of an object taken at a single angle is absent in a project that requires ten images of the object taken at different ten angles, the application may instruct the user to take the image of the object at the corresponding angle.

As described above, the application may further include a function that enables the user to utilize a chat service with other users through a chat room or to utilize an SNS. The chat service or the SNS may be provided through the server 150.

Figure 11:
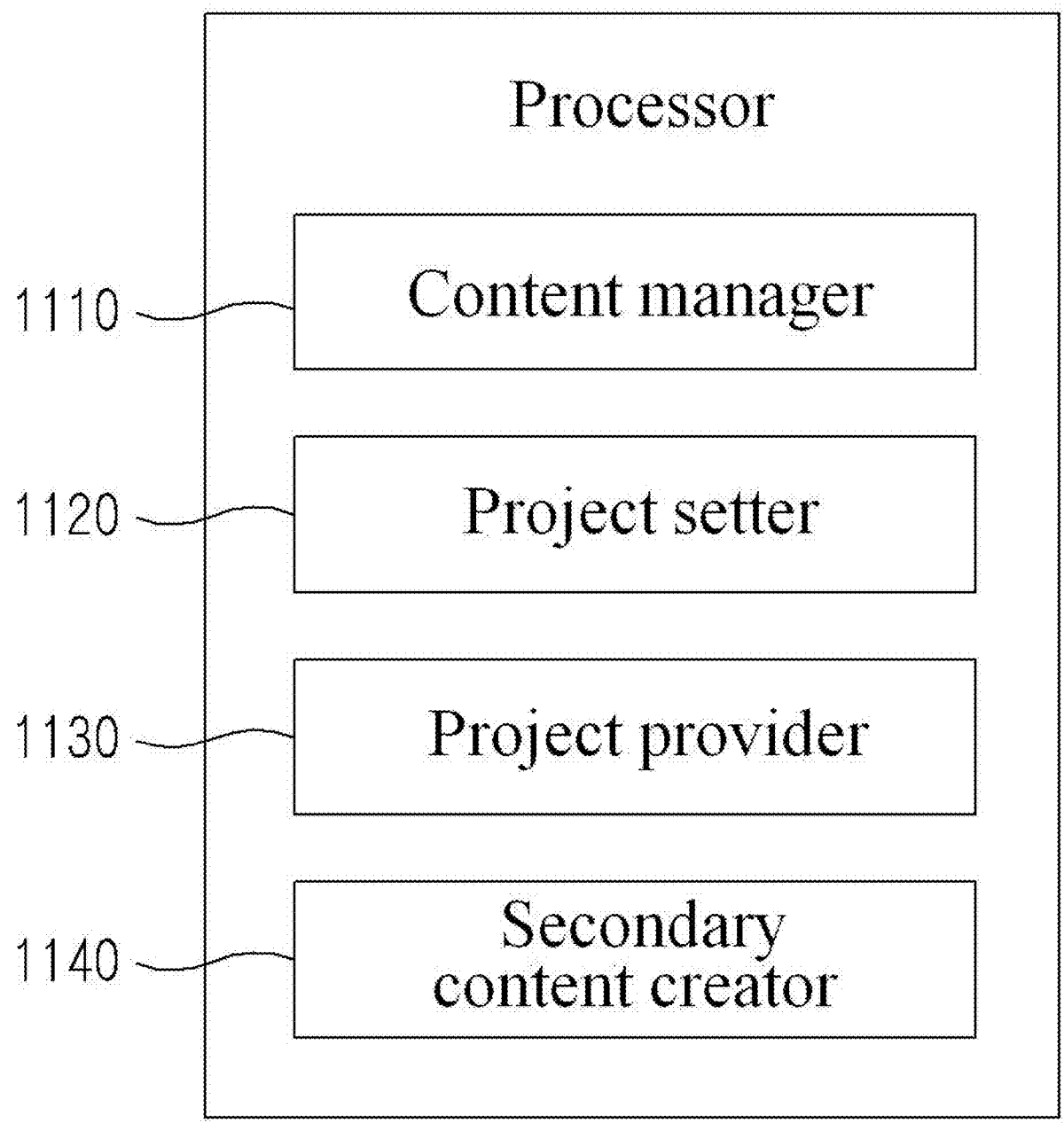
FIG. 11 is a block diagram illustrating a processor included in a server of FIG. 1, according to an example embodiment.
Figure 12:
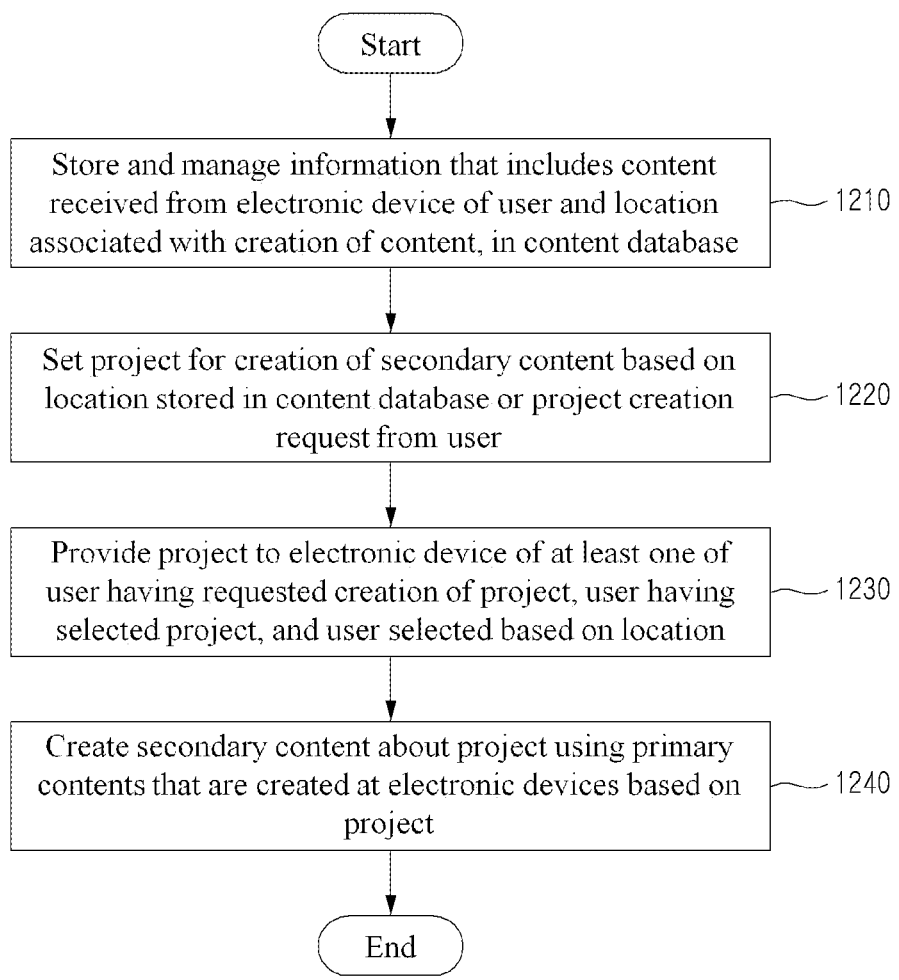
FIG. 12 is a flowchart illustrating a method performed at a server, according to an example embodiment.

FIG. 11 is a block diagram illustrating a processor included in a server of FIG. 1, according to an example embodiment. FIG. 12 is a flowchart illustrating a method performed at a server, according to an example embodiment. Referring to FIG. 11, the processor 222 included in the server 150 (a similar processor may be included in the server 160 shown in FIG. 1) may include a content manager 1110, a project setter 1120, a project provider 1130, and a secondary content creator 1140. The content elements of the processor 222 may be configured to perform operations 1210 through 1240 included in the method of FIG. 12 through at least one program code and the OS included in the memory 221.

While FIG. 11 illustrates the processor 222 as having individual components for carrying out one or more functionalities described in FIG. 12, example embodiments are not limited thereto. In one or more example embodiments, each of the server(s) 150 and/or 160 may have a memory associated therewith, on each of which a set of computer-readable instructions may be stored. In one or more example embodiments, the computer-readable instructions correspond to the functionalities described with reference to FIG. 12 and associated with the content manager 1110, the project setter 1120, the project provider 1130 and/or the secondary content creator 1140.

In one or more example embodiments, the processor 222 may execute the set of computer-readable instructions stored on the memory of the server(s) 150 and/or 160, so as to transform the processor 222 into a special purpose process configured to carry out the functionalities described with reference to FIG. 12 and associated with the content manager 1110, the project setter 1120, the project provider 1130 and/or the secondary content creator 1140. In FIG. 12, at operation 1210, the content manager 1110 of the server 150 may store and manage information that includes content received from an electronic device of a user and a location associated with creation of the content, in a content database. For example, primary content received according to a previously set project may be stored in the content database in association with a location, for example, GPS coordinates of an electronic device when the primary content is created. As described above, the content database may be configured to be included in the server 150 and may also be configured to communicate with the server 150 outside the server 150.

In operation 1220, the project setter 1120 may set (create) the project for creation of secondary content based on the location stored in the content database or a project creation request from the user. For example, the project may be created automatically by the server 150 and may also be created in response to a request from the user.

For example, the project setter 1120 may provide a user interface for receiving a project creation condition from the user. The server 150 may provide the user interface to the user through the electronic device 110 in response to the user connecting to the server 150 over the network 170 using the electronic device 110 and requesting creation of a project. Also, the server 150 may receive a condition input from the user through the user interface and may set the project for creation of the secondary content based on the received condition. For example, the condition may be information, such as a name, a location, etc., for designing an object, a type, such as a panoramic image, a 3D image, etc., of the secondary content to be created with respect to the object.

As another example, the projection creation condition may be input from an operator of the server 150. The project setter 1120 may provide the user interface to the operator and may receive the project creation condition from the operator. In this example, the server 150 may automatically create a project for creation of secondary content based on the condition input from the operator without a separate request from users.

Once the project is set, a constituent member for creating the secondary content according to the project may be selected.

In operation 1230, the project provider 1130 may provide the project to an electronic device of at least one of a user having requested creation of the project, a user having selected the project, and a user selected from the server 150 based on the location.

For example, users having selected the project may include users having selected the same project from among projects provided from the server 150. Also, the server 150 may also select users of electronic devices located at a specific place based on the location of the electronic devices of the users. Here, the server 150 may select users based on locations of users (e.g., locations of electronic devices of the users) from among users having set a personal relationship (for example, a friend) in a service (for example, an SNS) associated with the server 150, and users communicating through a single communication session (for example, a chat room) in the service (for example, a chat service) associated with the server 150. In one or more example embodiments, the project provider 1130 may provide the project to users of various groups based on a characteristic of the project.

The server 150 may select a user to be a constituent member of the project using a variety of methods.

For example, with respect to a project that includes constituent member(s), the server 150 may select a new user for the project based on a level of closeness between users. In detail, the server 150 may select the new user for the project from among other users based on a level of closeness between an existing constituent member of the project and each of the other users. A friend relation in an SNS, a relationship at a chat service, etc., may be used to calculate a level of closeness.

As another example, the server 150 may select the new user for the project based on a level of closeness between each of users and secondary content to be created through the project. In this example, an attribute, for example, a geographical location, an easiness of approach, a category of the secondary content, etc., may be used to calculate a level of closeness. In detail, a level of closeness of a user geographically closer to the object may be calculated to be greater than that between an attribute of secondary content and a user. Alternatively, a level of closeness of a user having a matter of interest closer to a category of secondary content may be calculated to be greater than that between an attribute of the secondary content and a user.

As another example, the server 150 may select, as the new user for the project, a user that desires to obtain the secondary content by requesting creation of the project or selecting the project, a user that requires a point obtainable by providing primary content for the secondary content, a user having a plan to move to a location associated with creation of the secondary content such as a location of the object, which is obtainable by analyzing a bulletin board, etc., of an SNC, and the like. Alternatively, the server 150 may select, as the user for the project, a user verified to have a similar kind of camera or a relatively excellent performance of camera based on, for example, a resolution of a photo uploaded by the user.

The server 150 may set an importance of the project based on the number of users desiring the secondary content, a reliability of a user that creates the project, and the like, and may use the importance of the project to select the user. For example, the reliability of the user may be calculated based on the number of times/ratio that the secondary content is created with respect to the created content, the number of times/ratio that the primary content is provided from the user participating in the project, etc. Here, the reliability may be calculated to be relatively high according to an increase in "number of times/ratio". A user having a relatively high reliability may be selected as the new user for the project according to an increase in the importance of the project.

Also, if a plurality of similar projects, for example, projects for creation of a 3D image with respect to the same object are present, the projects may be integrated under agreements of users. For example, if the number of constituent members is significantly small compared to the number of similar projects, the number of constituent elements may be adjusted to relatively increase by integrating two or more projects. Also, if a relatively large number of users are to participate in a single project, the single project may be separated into two or more projects and the users may be dispersed over the two or more projects.

The project may be provided to the selected users and users that agree with the provided project may be added as constituent members of the project.

In operation 1240, the secondary content creator 1140 may create secondary content about the project using primary contents that are created at electronic device(s) or user(s) based on the project. That is, when users create and transmit the primary contents through electronic devices of the users according to the project, the secondary content creator 1140 may create the secondary content using the transmitted primary contents.

For example, the primary contents may include images associated with a place included in the project or an object designated by the project. In this example, the secondary content creator 1140 may create at least one of a panoramic image, a 3-dimensional (3D) image, and an animation image as secondary content by synchronizing the images, using any known or to be developed method for creating panoramic images, 3D images, an animation images. In one or more example embodiments, the primary contents may further include a sound source or information about the sound source. Accordingly, the secondary content creator 1140 may create the secondary content by adding the received sound source or a sound source obtained through information about the received sound source to the at least one image that is created by synchronizing the images. Although the sound source or information about the sound source is not provided through the primary contents, the server 150 may select a specific sound source and may add the selected specific sound source to an image. The selection of the specification sound source may be performed randomly, based on previously selected sound sources associated with similar primary contents, etc.

Hereinafter, an example of an image combination algorithm for synchronizing images will be described.

The server 150 may extract featured points from each of the images using a feature detector. The server 150 may map featured points having a similar feature vector among featured points of each image taken at a location around an object of the same project. If a set of featured points greater than or equal to a threshold is determined as a part of the same object as a mapping result, for example, if an overlapping part is present between objects due to a movement and a rotation of an image, images may be synchronized by modifying images and by combining the overlapping parts in the two images.

Here, the server 150 may find a part corresponding to a relatively weak combination reliability. For example, an area in which an image deformation level is greater than or equal to a threshold, an area in which an overlapping part for combination is insufficient, an area in which an error is greater than or equal to a threshold, an area in which a resolution of a part for combination is relatively low, an area in which an obstacle is present, or an area in which a part marked with a user dissatisfaction against secondary content is present may be determined as the portion corresponding to the relatively weak combination reliability. Here, the server 150 may find the relatively weak combination part using a 3D construction technique and the like, and may find out which part of the object is to be taken at which location. A method of finding the relatively weak combination part may vary based on a style of secondary content desired in each project. If the relatively weak combination part is found, the server 150 may make a user relatively close to a location associated with secondary content such as a location of an object, or a user having a relatively high level of closeness, or a user that is to participate in a project, etc., participate in the project and may request the user to photograph the weak combination part.

Techniques used for the image combination algorithm may refer to the following web documents.

1. https://en.wikipedia.org/wiki/Feature_detection_(computer_vision)
2. https://en.wikipedia.org/wiki/Features_from_accelerated_segment_test
3. https://en.wikipedia.org/wiki/Corner_detection#The_Harris_.26_Stephens_0.2F_Plessey_corner_detect- ion_algorithm
4. https://en.wikipedia.org/wiki/Scale-invariant_feature_transform
5. https://en.wikipedia.org/wiki/Speeded_up_robust_features
6. https://en.wikipedia.org/wiki/Triangulation_(computer_vision)

Also, an image, a video, etc., may be provided as primary content. Secondary content may be created as a video or a 3D image in such a manner that the server 150 combines images or partial frames of a video, etc. For example, the server 150 may create a single video or 3D image as secondary content by calculating a feature vector about an image provided as the primary content, a feature vector for each frame of a video, a feature vector for a variation characteristic of sound, and the like, and by obtaining frames required to create a video. In this example, the server 150 may obtain the required frames based on an overlapping part between frames of each video, and may find the relatively weak combination part and may request users to take an image or a video for the found weak combination part.

According to one or more example embodiments, in operation 1240, the secondary content creator 1140 may also create the secondary content using the primary contents and contents that are retrieved from the content database based on locations associated with creation of the primary contents. For example, contents created at different timings with respect to a single project may be stored in the content database. Similar content may be uploaded through another project instead of the project and be stored in the content database. Accordingly, the secondary content creator 1140 may also create the secondary content by further using the content stored in the content database.

The service, for example, the aforementioned chat service or SNS, associated with the server 150 may be provided to each of the users through an application, for example, a messenger app, an SNS app, etc., executed on an electronic device. Here, the project may be pushed to the electronic device through the application or may be provided to electronic devices connected to a communication session, for example, a chat room of a chat service, under control of the application through the communication session.

According to one or more example embodiments, the project may include a mission for creating insufficient content in creating the secondary content using the contents stored in the content database. Here, in operation 1230, the project provider 1130 may transmit the project to an electronic device of a first user having selected the project and may request creation of the insufficient content. For example, the project according to example embodiments may be information for requesting the user for content that is currently further required to create the secondary content in the content database. In detail, for example, when the user A selects a type of desired work (e.g., secondary media), the server 150 may find contents uploaded by existing users and stored in the content database, insufficient for creating the desired work. Therefore, the server 150 may assign a mission/project to the user A for remedying the identified insufficiency for creating the desired work.

According to one or more example embodiments, in operation 1230 described above, the project provider 1130 may provide the project to electronic devices of the users having selected the same project and may connect a communication session between the electronic devices of the users having selected the same project. For example, when the user A and the user B select the same project in order to create the same type of work, the server 150 may connect the user A and the user B by providing the project to an electronic device of the user A and an electronic device of the user B, and by opening a chat room for the user A and the user B. As described above, the server 150 may support the easy collaboration for the same project between users who may even be unknown to one another, by creating a chat room for the users to create the project/work.

According to one or more example embodiments, although not illustrated, the method of FIG. 12 may further include determining whether primary content of a first user that is provided with a first project is required for a second user that is provided with a second project. Accordingly, the primary content of the first user may be provided to/shared with an electronic device of the second user as the content required for the second project. The non-illustrated operations may be performed by a content sharer (not shown) that may also be part of the processor 222, or in the alternative, computer-readable instructions associated therewith may be executed by the processor 222 so that the processor 222 becomes a special purpose processor configured to carry out, among other functions, the functionalities of the content sharer.

According to one or more example embodiments, the project may include a mission for creating the secondary content using contents that are uploaded by users communicating through a single communication session. In this case, in operation 1240, the secondary content creator 1140 may create the secondary content by employing the contents uploaded through the single communication session as the primary contents. For example, when users A, B, and C having traveled together or currently traveling together upload photos taken during the travel in a chat room in order to share the photos, the server 150 may create the secondary content using contents uploaded by participants of the chat room. Here, the uploaded photos taken during the travel may not be related to each other. Even in this case, the secondary content such as travel story may be created and provided by mixing photos shared in the chat room.

According to one or more example embodiments, the primary contents may include a first image in which an object designated by the project and a first user are included and a second image in which the object and a second user is included. Here, in operation 1240, the secondary content creator 1140 may synthesize the first image and the second image and may create, as the secondary content, a third image in which the first user and the second user are included. For example, the secondary content creator 1140 may provide, as the secondary content, a photo in which the first user and the second having taken a photo with the same object through different travels are synthesized as if the first user and the second user have traveled together.

According to one or more example embodiments, the primary contents may include a first image in which an object designated by the project is included and a second image in which a photographer of the first image is included. Here, in operation 1240, the secondary content creator 1140 may synthesize the first image and the second image and may create a third image in which the object and the photographer are included. In an example in which the first user creates an image taken from the object and the second user creates an image taken from the first user, the secondary content creator 1140 may create an image in which the object and the first user are included by synthesizing the two images.

According to one or more example embodiments, the project may include information about a place for photographing or an object, and the primary contents may include an image taken at the place or an image taken from the object. Here, although not illustrated, the method of FIG. 12 may further include creating information including recommendations on a shooting location or a shooting angle about the place or the object based on contents stored in the content database, and transmitting the information to users that are provided with the project. For example, information regarding a recommendation on a shooting location or an angle based on the secondary content or the primary content created at the same location as a location of the user may be provided to the user. The non-illustrated operation may be performed by a recommendation provider (not shown) includable in the processor 222, or in the alternative, computer-readable instructions associated therewith may be executed by the processor 222 so that the processor 222 becomes a special purpose processor configured to carry out, among other functions, the functionalities of the recommendation provider.

According to one or more example embodiments, although not illustrated, the method of FIG. 12 may further include extracting content from the content database based on a location associated with creation of primary content that is received from a first user, and creating predicted content about the secondary content based on the extracted content and the primary content and providing the predicted content to the first user. For example, once the user creates the content, the server 150 may predict a result based on existing contents and may provide a preview function, etc., to the user. The non-illustrated operations may be performed by a predicted content creator (not shown) further includable in the processor 222, or in the alternative, computer-readable instructions associated therewith may be executed by the processor 222 so that the processor 222 becomes a special purpose processor configured to carry out, among other functions, the functionalities of the predicted content creator.

According to one or more example embodiments, the project may include secondary content that is created through participation of a first user. In operation 1230, the provider 1130 may provide the project to a second user having set a personal relationship with the first user in a service associated with the server 150. In this case, the secondary content created through participation of the first user may be provided to the second user.

According to one or more example embodiments, the primary contents may include a first image in which a first user and a second user are included and a second image in which a third user is included. In operation 1240, the secondary content creator 1140 may synthesize the first image and the second image and may create a third image in which the first user or the second user is replaced with the third user.

According to one or more example embodiments, the project setter 1120 may receive a project creation request that includes content of a first user and a location associated with creation of the content of the first user from an electronic device of the first user, and may set the project. Here, the project provider 1130 may provide the project to users selected based on the location associated with creation of the content of the first user. For example, when a user takes a photo of a specific incident and requests creation of a project, users located at a location associated with the specific incident may be requested to create an image associated with the specific incident.

According to one or more example embodiments, the project may be set to include information for requesting mission participation to users having uploaded contents at the same location during a preset period. Here, in operation 1240, the secondary content creator 1140 may create the secondary content by employing, as the primary contents, contents that are received from electronic devices of users that allow the mission participation in response to the information for requesting the mission participation. For example, when users upload contents at similar points in times at a location associated with the specific incident, the secondary content creator 1140 may create the secondary content using the uploaded contents.

According to one or more example embodiments, the primary contents may include images in which a place included in the project or an object designated by the project is taken at different locations or at different angles. Here, although not illustrated, the method of FIG. 12 may further include requesting an image by transmitting a new project that includes information about a required location or an angle, to an electronic device located at the place, or requesting the image by transmitting the new project to electronic devices of users that participate in a communication session of a service associated with the server 150, when the image at the location required for creation of the secondary content or the image at the angle required for creation of the secondary content is absent or insufficient. As described above, when a primary content for creating the secondary content is insufficient, the users may be requested to create and provide the primary content. The non-illustrated operation may be performed by an image requester (not shown) further includable in the processor 222, or in the alternative, computer-readable instructions associated therewith may be executed by the processor 222 so that the processor 222 becomes a special purpose processor configured to carry out, among other functions, the functionalities of the image requestor.

According to one or more example embodiments, in operation 1230, the project provider 1130 may transmit the project to electronic devices located at the same place based on current locations of electronic devices among electronic devices of users having set a personal relationship through a service (e.g., a chat service) associated with the server 150. Here, the project may include information for designating at least one of users of the electronic devices located at the same place as an object, action information required for the user designated as the object, and information about angles or locations for the remaining users to take a photo of the user designated as the object. For example, a project for obtaining images taken from a specific user as an object, from among users present in the same place, may be provided to the users. As another example, a mission may be provided to users so that remaining users simultaneously take a photo of a user selected as an object at a moment at which the user selected as the object performs an action (e.g., at a moment when the selected user jumps). To this end, information about locations and shooting angles of the remaining users with respect to the object may be provided to the users.

According to one or more example embodiments, a function for editing the project may be provided through an application executed on each of the electronic devices. Here, in operation 1220, the project setter 1120 may receive a project edited at an electronic device of a first user through the function and may set a new project. Further, although not illustrated, the method of FIG. 12 may further include creating predicted content by extracting content corresponding to the new project from the content database, and providing the created predicted content to an electronic device of the first user. As described above, the user may create the new project by editing an existing project. The server 150 may provide a result of the edited project to the user in a preview form. The non-illustrated operation may be performed by a predicted content creator (not shown) further includable in the processor 222, or in the alternative, computer-readable instructions associated therewith may be executed by the processor 222 so that the processor 222 becomes a special purpose processor configured to carry out, among other functions, the functionalities of the predicted content creator.

According to one or more example embodiments, the project may include a mission for photographing a single object at the same point in time. In this case, although not illustrated, the method of FIG. 12 may further include providing a shoot command in which shooting points in times are synchronized to electronic devices of users that participate in the mission. Images of the object taken at the same point in time may be created in response to the electronic devices taking a photo at the synchronized shooting point in time in response to the shoot command received from the server 150. The non-illustrated operation may be performed by a shoot command provider (not shown) further includable in the processor 222, or in the alternative, computer-readable instructions associated therewith may be executed by the processor 222 so that the processor 222 becomes a special purpose processor configured to carry out, among other functions, the functionalities of the shoot command provider.

Figure 13:
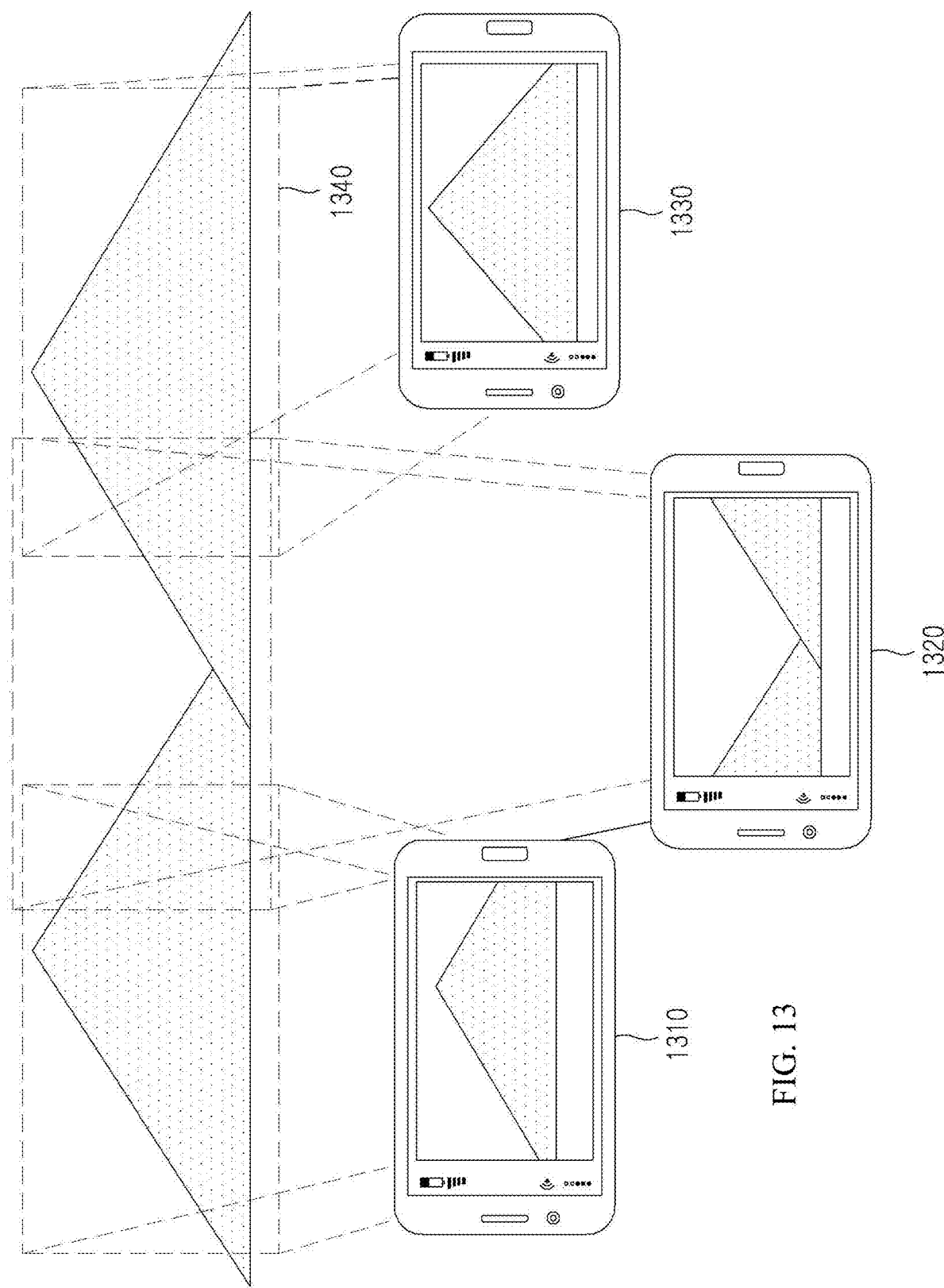
FIG. 13 illustrates an example of taking a photo of a background at the same place, according to an example embodiment.
Figure 14:
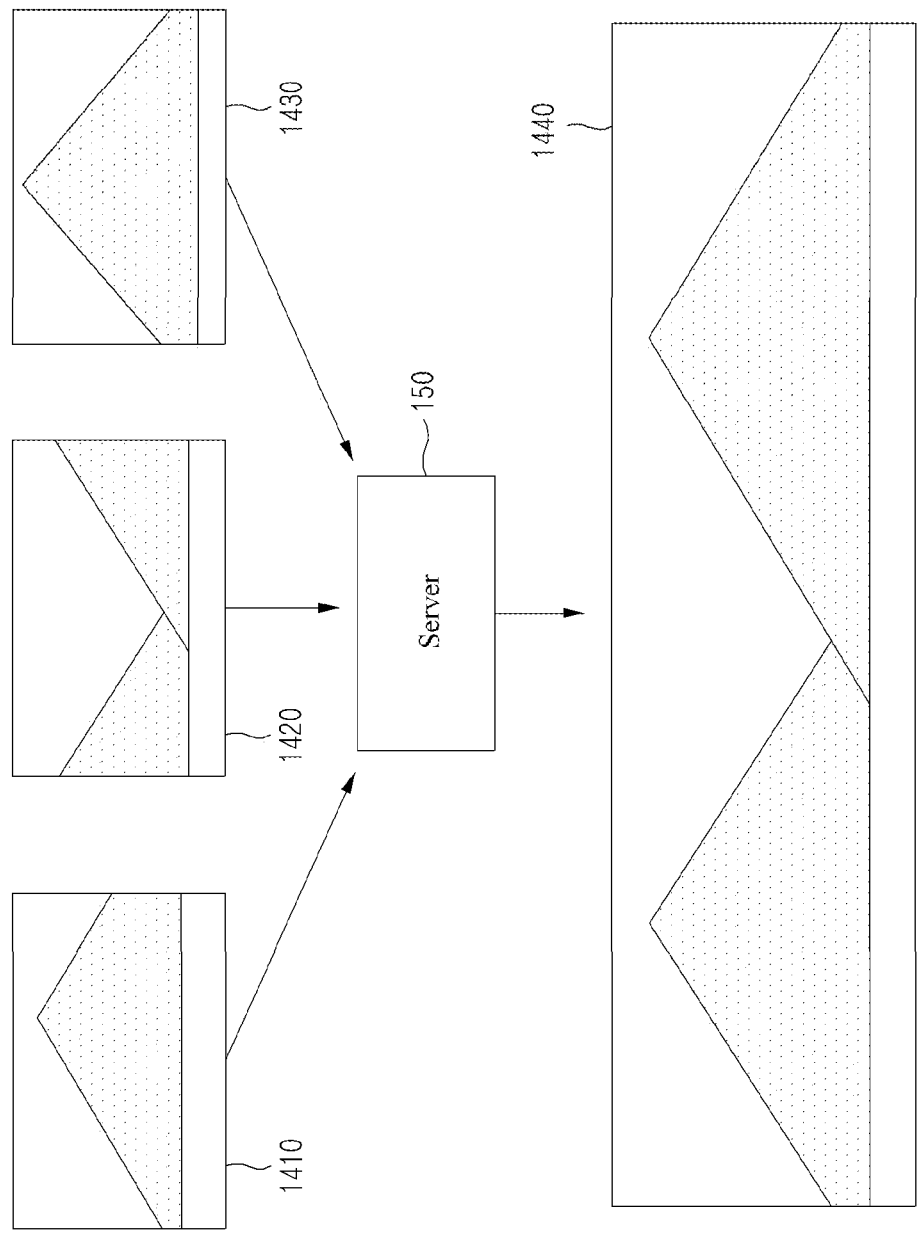
FIG. 14 illustrates an example of creating a panoramic image using photos taken at the same place, according to an example embodiment.

FIG. 13 illustrates an instance of taking a photo of a background at the same place, according to an example embodiment. FIG. 14 illustrates an instance of creating a panoramic image using photos taken at the same place, according to an example embodiment.

FIG. 13 illustrates an example in which each of three user devices (e.g., smartphones) 1310, 1320, and 1330 has taken a photo of a single place/location such as the background 1340. The three user devices 1310, 1320, and 1330 may have taken a photo of the background 1340 at the same time according to a mission provided from the same project, may also have taken a photo of the background 1340 at different times (different dates, week days, months, years, etc.), and/or may also have taken a photo of the background 1340 individually irrespective of the project.

FIG. 14 illustrates an example in which photos 1410, 1420, and 1430 taken by the three user devices 1310, 1320, and 1330 are uploaded to the server 150 and the server 150 creates a single panoramic photo 1440 of the background 1340 using the uploaded photos 1410, 1420, and 1430. When the photos 1410, 1420, and 1430 are associated with a project, the panoramic photo 1440 may be created as secondary content for the project. Also, the panoramic photo 1440 may be created as reference, for example, predicted content provided to another user at a corresponding place, not as secondary content of a specific project, and be provided to other users.

Figure 15:
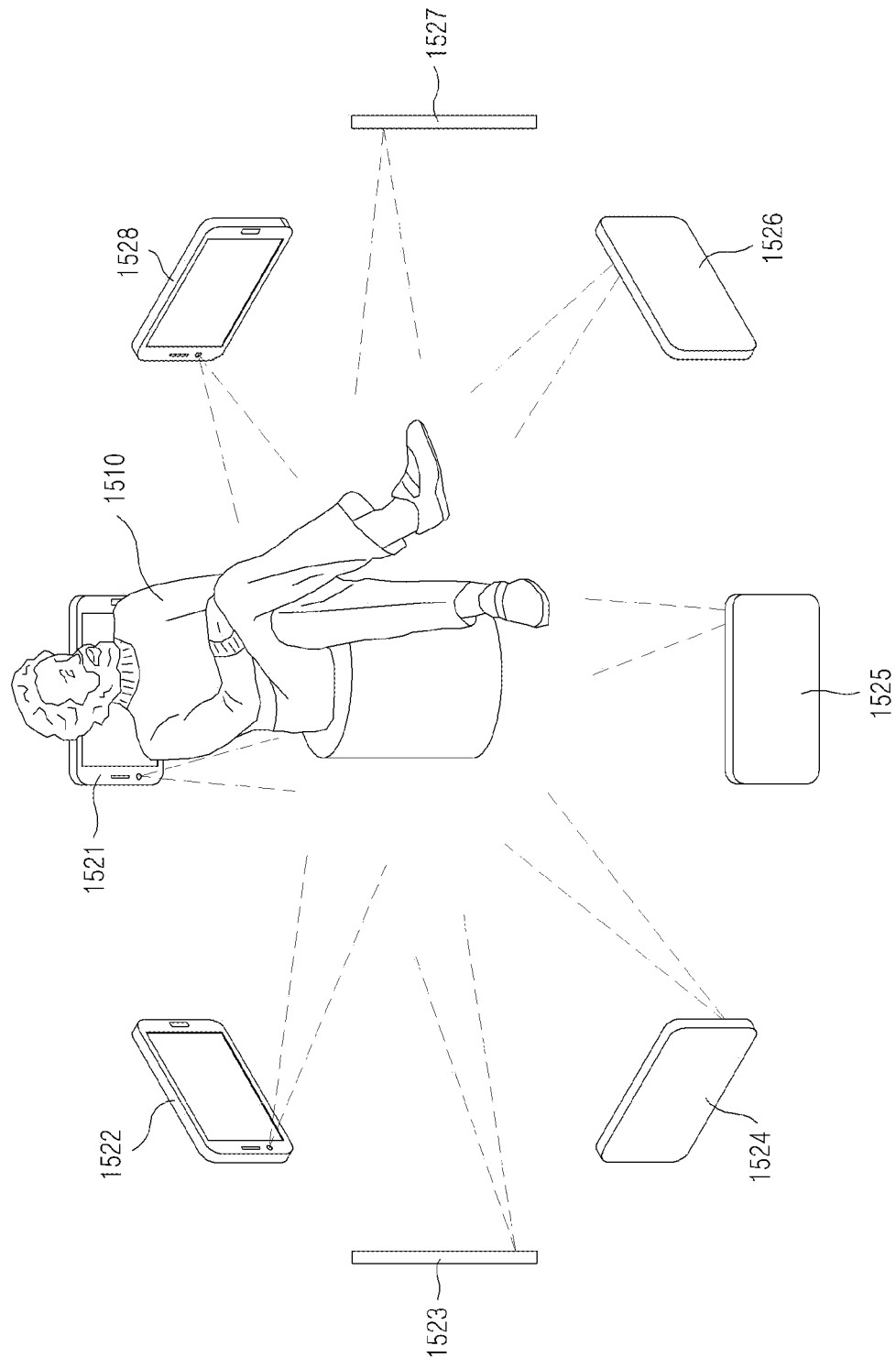
FIG. 15 illustrates an example of taking a photo to create a three-dimensional (3D) image, according to an example embodiment.

FIG. 15 illustrates an example of taking a photo to create a three-dimensional (3D) image, according to an example embodiment. FIG. 15 illustrates an example in which a plurality of user devices (e.g., smartphones, cameras, etc.) 1521, 1522, 1523, 1524, 1525, 1526, 1527, and 1528 (1521 through 1528) take a photo of a single object 1510 at preset angles. For example, a project provided to the plurality of user devices 1521 through 1528 may include a mission of taking a photo of the object 1510 and may include information about a location (angle) for taking a photo of the object 1510. In detail, for example, information about eight locations for eight users may be included in the project. Here, a shooting location for each of the users may be designated in advance by the server 150 and an individual shooting location may be determined through collaboration among the users.

Photos taken from the plurality of user devices 1521 through 1528 may be transmitted to the server 150 as primary contents and the server 150 may create secondary content such as a 3D image of the object 1510 using the transmitted photos.

As described above, when the plurality of user devices 1521 through 1528 are to simultaneously take a photo of the object 1510, users may directly perform a manipulation, such as a screen touch, etc., for photographing of shuttering of the user devices 1521 through 1528. In this case, it is difficult to simultaneously take a photo of the object 1510. Accordingly, the server 150 may transmit a command in which shooting points in times are synchronized to the plurality of user devices 1521 through 1528 so that the plurality of user devices 1521 through 1528 may take a photo of the object 1510 simultaneously at the synchronized point in time.

Figure 16:
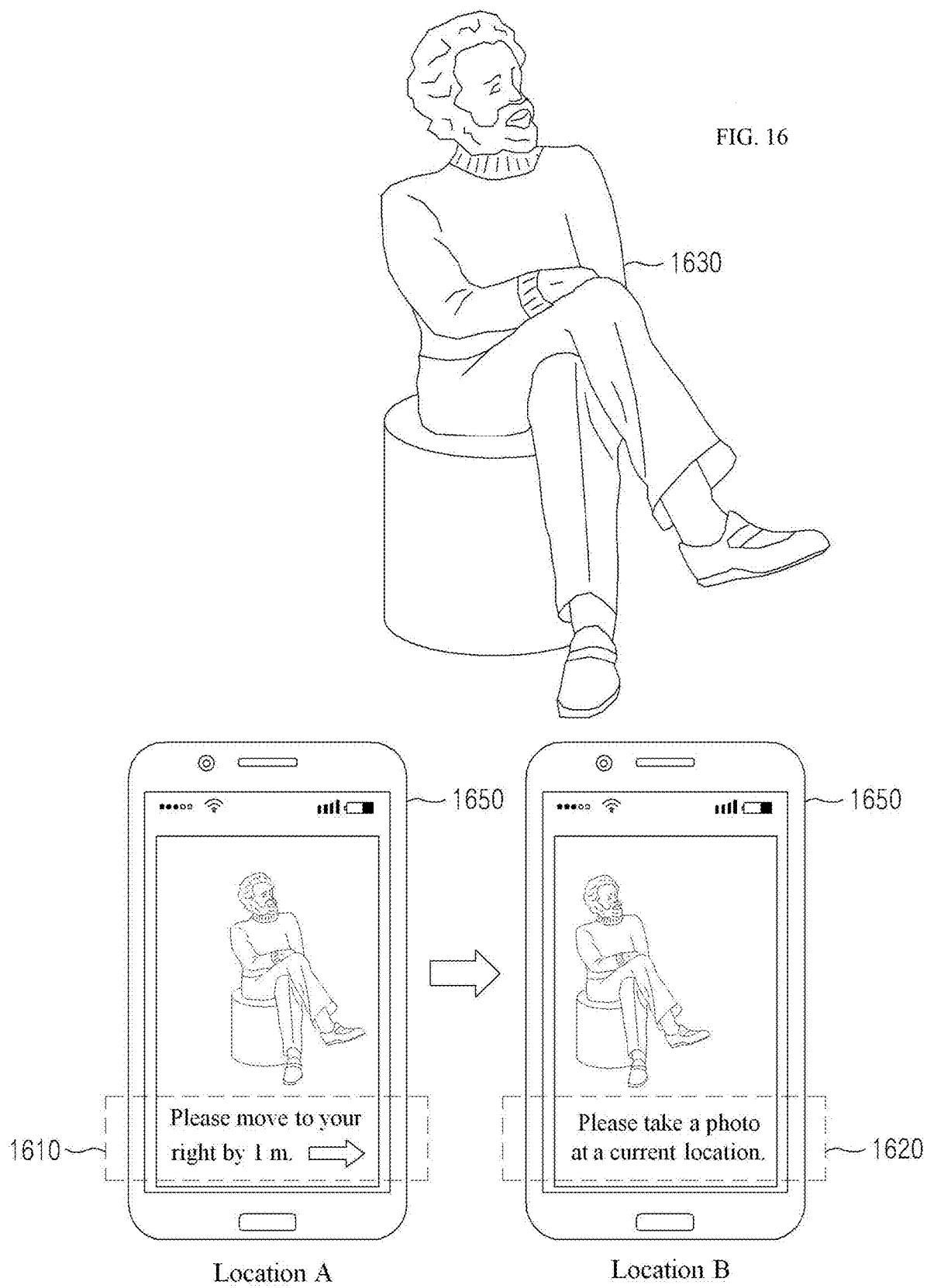
FIG. 16 illustrates an example of a server providing instructions to a user device to be at a shooting location, according to an example embodiment.

FIG. 16 illustrates an example of a server providing instructions to a user device to be at a shooting location, according to an example embodiment. For example, the server 150 may instruct a user to move to a shooting location for taking an image of the object (which may be a person) 1630 based on location information, for example, GPS coordinates, received from a user equipment of the user, such as the user device 1650. For example, the server 150 may transmit information to the user device 1650 for instructing the user associated with the user device 1650 to move to a shooting location (to move to location B from location A) to the terminal of the user. Here, as illustrated in a first box 1610 marked with dotted lines, an application installed on the user device 1650 of the user may control the terminal to display information received from the server 150, for instructing the user to move the user device 1650 to move to a shooting location (e.g., to move from location A to location B). Once the user device 1650 is at an intended shooting location, the server 150 may transmit information for instructing the user to take a photo of the object 1630 as illustrated in a second box 1620 marked with dotted lines.

Here, a location of the user device 1650 may be verified by further utilizing information input through a camera of the user device 1650 in addition to GPS coordinates. For example, an image of the object 1630 taken using the camera of the user device 1650 may be transmitted to the server 150 under control of the application. Here, the server 150 may analyze the transmitted image of the object 1630 and may determine whether an image of the object 1630 taken at another angle is required. If the image of the object 1630 taken at the other angle is required to create secondary content, the server 150 may instruct the user to move the user device 1650 to a desired location so that the user may take a photo of the object 1630 at the corresponding angle.

Map information and the like, similar to navigation, may be used as technology for instructing the user device 1650 of the user to the desired shooting location.

Figure 17:
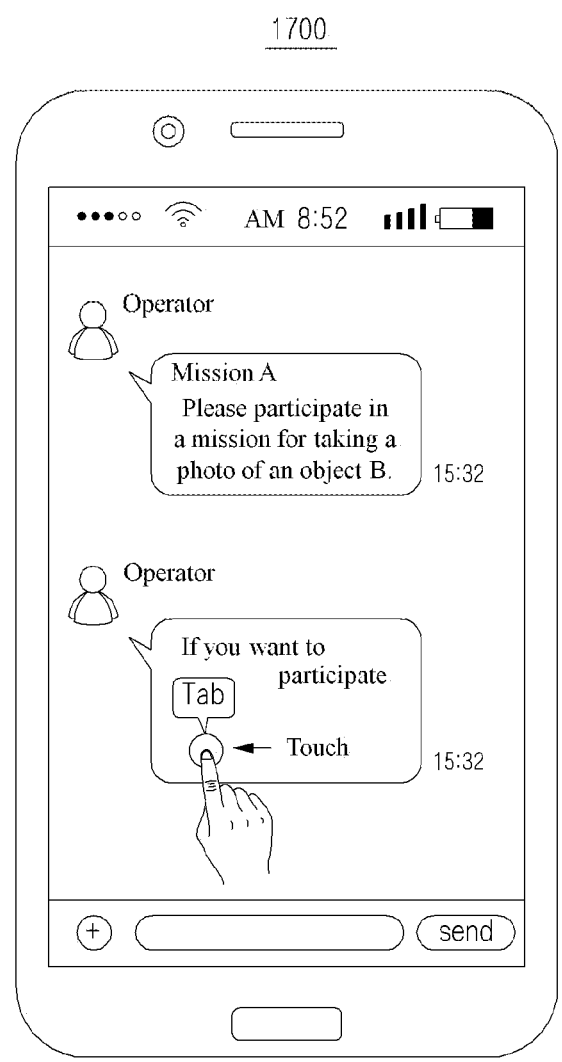
FIG. 17 illustrates an example of a server providing instructions to user devices to participate in a project through a chat room, according to an example embodiment.

FIG. 17 illustrates an example of a server providing instructions to user devices to participate in a project through a chat room, according to an example embodiment. FIG. 17 illustrates an example of a screen 1700 for instructing users connected to a group chat room to participate in a take-a-photo mission through the group chat room. That is, FIG. 17 illustrates an example of transmitting a project to users communicating through the same communication session. Here, when users having expressed the intent to take a photo are present, the server 150 may provide detail information for undertaking and completing the project, to the users. In one or more example embodiments, when the number of users having expressed the intent to take a photo is insufficient to create secondary content for the project, to the server 150 requests the same user to create a plurality of primary contents. Also, it is possible to select additional users and to instruct the selected users to participate in the project.

In one or more example embodiments, the camera or the device by the which the primary content is captured may not be embedded within the electronic device (such as the electronic devices 110, 120, 130 and/or 140 shown in FIG. 1) but may rather communicate wirelessly with electronic device. This will be further described below with reference to FIG. 18. Furthermore, as will be described below, the primary content may not be an image or an audio but rather may be a combination of moving images and audio (e.g., a video).

Figure 18:
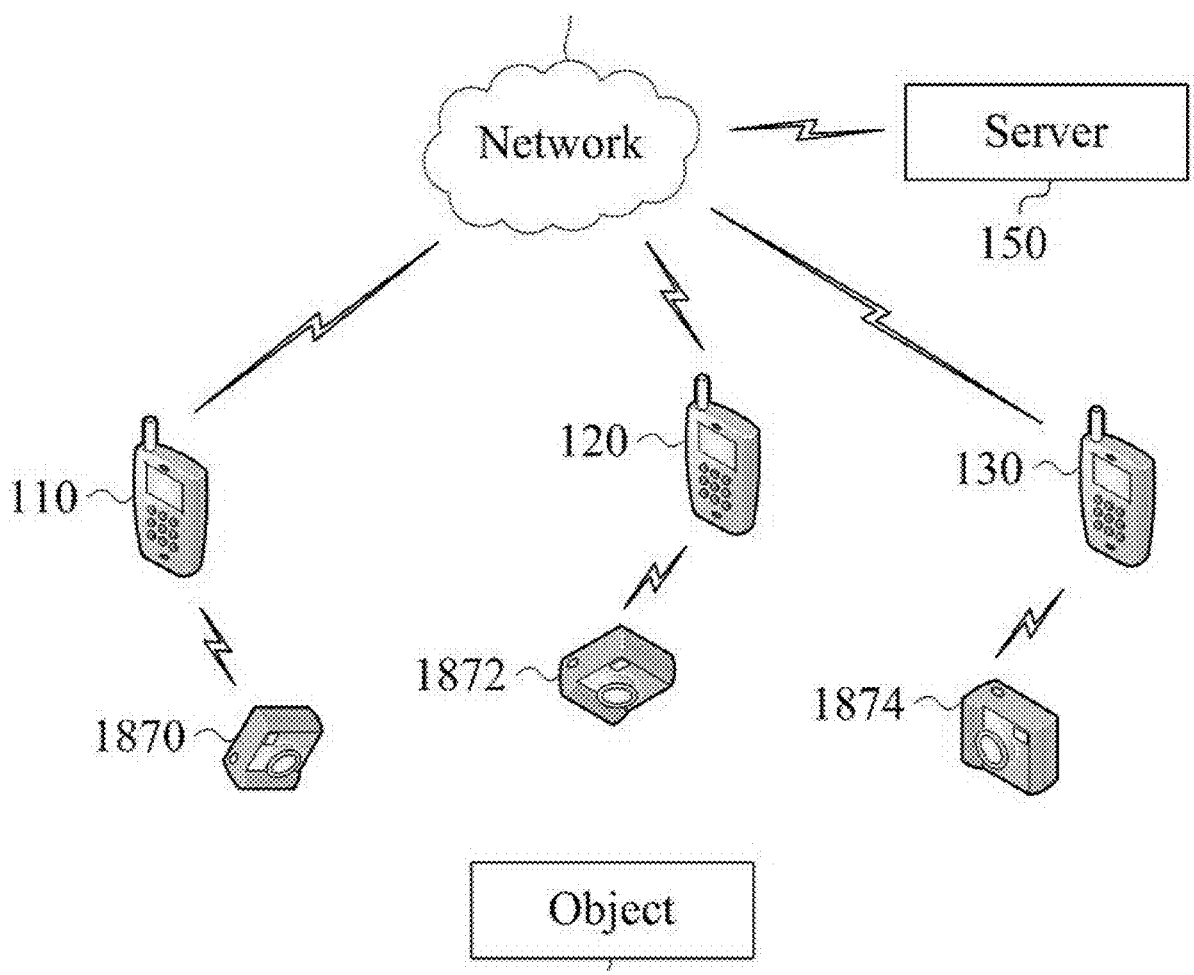
FIG. 18 is a block diagram illustrating a configuration of an electronic device, a content capturing device and a server, according to an example embodiment.

FIG. 18 is a block diagram illustrating a configuration of an electronic device, a content capturing device and a server, according to an example embodiment.

As shown in FIG. 18, an object 1800 based on which each of electronic devices 110, 120 and 130 may create primary content as described above. Each of the electronic devices 110, 120 and 130 may have a corresponding content capturing device, namely content capturing devices 1870, 1872 and 1874, respectively. The electronic devices 110, 120 and 130 may communicate wirelessly with the respective one of the content capturing devices 1870, 1872 and 1874. Each of the content capturing devices 1870, 1872 and 1874 may be a wireless enabled video capturing device such as a camera, an audio capturing device or a combination of both. For purposes of describing FIG. 18, the content capturing devices 1870, 1972 and 1874 may be any type of commercially available video/audio capturing device such as GoPro cameras. However, example embodiments are not limited thereto.

In one or more example embodiments, the electronic devices 110, 120 and 130 may belong to three different users (e.g., three friends) taking part in an outdoor activity such as skiing. The object 1800 may be a fourth friend skiing down the slopes. The friends, using the application provided by the server 150 may want to capture and create secondary content (secondary video or a sequence of images) documenting the skiing of the fourth friend down the slopes).

A user of one of the electronic devices 110, 120 and 130 may initiate the above-described application on the corresponding one of the electronic devices 110, 120 and 130 and request the server to create/set a project for recording/document the fourth friend's skiing. Upon setting up the project, according one or more example embodiments as described above, the server 150, via the network 170, may transmit the set project to the electronic devices 110, 120 and 130. Upon receiving the set project, each of the electronic devices 110, 120 and 130 may transmit a command to the corresponding one of the cameras 1870, 1872 and 1874 to start the recording of the fourth friend's skiing. In one or more example embodiments and upon receiving the set project, users of the electronic devices 110, 120 and 130 manually activate the cameras 1870, 1872 and 1874 to start recording the fourth friend's skiing and sending the recordings to the corresponding one of the electronic devices 110, 120 and 130.

In one or more example embodiments, the captured video by the cameras 1870, 1872 and 1874 may be sent to the corresponding electronic devices 110, 120 and 130 (for example in real-time), which may then be sent to the server 150 via the network 170.

Thereafter, the server 150 may create the secondary content using the videos/images captured by the cameras 1870, 1872 and 1874. The server 150 may create the secondary content using one or more example embodiments of creating the secondary content, as described above.

In one or more example embodiments and when the primary content captured by the cameras 1870, 1872 and 1874 are videos, the secondary content may be created to render a 3D video of the fourth skiers and/or provide an impression that a single video of the fourth skier is captured using a wide-angle camera or a spider camera.

In one or more example embodiments and when the primary contents captured by the cameras 1879, 1872 and 1874 are still images, the secondary content may be a combination of captured still images to render a panoramic image of the fourth skier's skiing. In one or more example embodiments, an audio file may also be added to the created secondary content, according to example embodiments described above.

In one or more example embodiments, the number of electronic devices 110, 120 and 130 and content capturing devices 1870, 1872, and 1874, need not be limited to three and the relationship between the electronic devices 110, 120 and 130 and the content capturing devices 1870, 1872 and 1874 need not be limited to a one-to-one relationship.

While the example of skiing and three user devices are described above with reference to FIG. 18, example embodiments are not limited thereto.

As described above, according to one or more example embodiments, it is possible to specify a result in advance even during a project setting process and to reduce (or alternatively, minimize) a calculation amount required for creating the result by providing specific users with a project that is created in response to a request from users or a project that is created based on previously received contents, by instructing the specific users to create contents based on the project, and by creating secondary content based on the contents created by the specific users in association with the project.

The foregoing description has been provided for purposes of illustration and description. It is not intended to be exhaustive or to limit the disclosure. Individual elements or features of example embodiments are generally not limited to that particular embodiment, but, where applicable, are interchangeable and may be used in any selected example embodiment, even if not specifically shown or described. The same may also be varied in many ways. Such variations are not to be regarded as a departure from the disclosure, and all such modifications are intended to be included within the scope of the disclosure.

What is claimed is:

1. A method comprising:
   receiving, at a server, one or more pieces of first primary content and first location information from one or more first user devices, the first location information including first respective locations at which the one or more pieces of the first primary content are created;
   storing, by the server, the one or more pieces of the first primary content and the first respective locations in a content database to correspond to each other;
   creating, at the server, a project for creating secondary content based on the received one or more pieces of the first primary content, the creating including at least one of (i) automatically setting the project including one or more project conditions by analyzing the one or more pieces of the first primary content that is stored in the content database associated with the server or (ii) setting the project in response to a project setting request and one or more project creation conditions inputted by a specific user;
   selecting, by the server, one or more second user devices based on a relationship with the one or more first user devices;
   providing, by the server, the selected one or more second user devices with the project for the selected one or more second user devices to create one or more pieces of second primary content through the project;
   receiving, by the server, the created one or more pieces of the second primary content and second location information associated therewith from the selected one or more second user devices, the second location information including second respective locations at which the one or more pieces of second primary content are created;
   saving, by the server, the created one or more pieces of the second primary content and the second location information associated therewith in the content database;
   creating the secondary content using at least the one or more pieces of the first primary content, the one or more pieces of second primary content, the first location information, and the second location information; and
   granting, by the server, access to the created secondary content to a plurality of user devices,
   wherein a first reception time of the first primary content, a second reception time of the one or more pieces of the second primary content, and a creation time of the secondary content are different from each other, and
   wherein the method further comprises creating a recommendation for at least one of the one or more second user devices on at least one of a shooting location or a shooting angle at which at least one of a first image of a place and a second image of an object is to be taken, the recommendation being provided based on the one or more pieces of the first primary content stored in the content database associated with the server.

2. The method of claim 1, wherein the selecting includes selecting the one or more second user devices based on the one or more project creation conditions to form a group uploading the one or more pieces of the second primary content and the second location information associated therewith in response to the creating setting the project based on the project setting request and the one or more project creation conditions inputted by the specific user.

3. The method of claim 2, wherein the providing includes transmitting the project to the one or more second user devices through an application executed on each of the one or more second user devices.

4. The method of claim 2, wherein
   the one or more pieces of the first primary content and the one or more pieces of the second primary content include a third image and a fourth image, the third image includes a first user associated with a first one of the plurality of user devices and the object, the fourth image includes the object and a second user associated with a second one of the plurality of user devices, and
   the creating the secondary content includes synthesizing the third image and the fourth image and creating, as the secondary content, a fifth image in which the first user and the second user are included.

5. The method of claim 2, wherein
   the project includes project information on at least one of the place for photographing or the object, and the one or more pieces of the first primary content and the one or more pieces of the second primary content include at least one of the first image taken at the place and the second image taken from the object, and
   the method further comprises
      transmitting the recommendation to the at least one of the one or more second user devices.

6. The method of claim 2, wherein the providing includes providing the project to the one or more second the user devices, the one or more second user devices having set a personal relationship with the one or more first user devices in a communication session provided by the server.

7. The method of claim 2, wherein
   the one or more pieces of the first primary content and the one or more pieces of the second primary content include a plurality of images in which at least one of the place included in the project or the object designated by the project is taken at at least one of different locations and different angles, and
   the method further comprises transmitting the project to the one or more second user devices to request the plurality of images, the project including information on at least one of the different locations and the different angles at which the plurality of images are to be captured and subsequently provided to the server for creation of the secondary content.

8. The method of claim 2, further comprising:
providing one or more of the one or more second user devices with an option to edit the project upon providing the project, and
receiving an edited project from the one or more of the one or more second user devices, the edited project being the project based on which the creating the secondary content creates the secondary content.

9. The method of claim 8, further comprising:
creating preliminary secondary content using content corresponding to the edited project from the content database and the one or more pieces of the first primary content after receiving the one or more pieces of first primary content and the first location information from the one or more first user devices; and
providing the preliminary secondary content to one or more of the plurality of user devices.

10. The method of claim 1, wherein
the one or more pieces of the first primary content and the one or more pieces of the second primary content include the first image associated with the place included in the project or the second image associated with the object designated by the project,
the secondary content is at least one of a panoramic image, a three-dimensional (3D) image, or an animation image, and
the creating the secondary content includes synchronizing the images.

11. The method of claim 10, wherein
the one or more pieces of the first primary content and the one or more pieces of the second primary content further include a sound source or information about the sound source associated with the one or more pieces of the first primary content and the one or more pieces of second primary content, and
the creating the secondary content includes creating the secondary content by adding the sound source to the synchronized images.

12. The method of claim 1, further comprising:
extracting content from the content database based on the first location information;
creating a preliminary secondary content based on the extracted content and the one or more pieces of the first primary content associated with the first location information, the preliminary secondary content being a preview of the secondary content; and
providing the preliminary secondary content to one or more of the plurality of user devices.

13. The method of claim 1, wherein
the one or more pieces of the first primary content and the one or more pieces of the second primary content include a sixth image in which a first user and a second user are included and a seventh image in which a third user is included, and
the creating the secondary content includes synthesizing the sixth image and the seventh image to create an eighth image in which the first user or the second user is replaced with the third user.

14. The method of claim 1, wherein the one or more first user devices and the one or more second user devices have at least one user device in common.

15. A server comprising:
a memory having computer-readable instructions stored therein; and
a processor configured to execute the computer-readable instructions to,
receive one or more pieces of first primary content and first location information from one or more first user devices, the first location information including first respective locations at which the one or more pieces of the first primary content are created,
store the one or more pieces of the first primary content and the first respective locations in a content database to correspond to each other,
create a project for creating secondary content based on the received one or more pieces of the first primary content, the creating including at least one of (i) automatically setting the project by analyzing the one or more pieces of the first primary content that is stored in the content database associated with the server or (ii) setting the project in response to a project setting request and one or more project creation conditions inputted by a specific user,
select one or more second user devices based on a relationship with the one or more first user devices,
provide the selected one or more second user devices with the project for the selected one or more second user devices to create one or more pieces of second primary content through the project,
receive the created one or more pieces of the second primary content and second location information associated therewith from the selected one or more second user devices, the second location information including second respective locations at which the one or more pieces of the second primary content are created,
save the created one or more pieces of the second primary content and the second location information associated therewith in the content database,
create the secondary content according to at least the one or more pieces of the first primary content, the one or more pieces of the second primary content, the first location information, and the second location information, and
grant access to the created secondary content to a plurality of user devices,
wherein a first reception time of the first primary content, a second reception time of the one or more pieces of the second primary content, and a creation time of the secondary content are different from each other, and
wherein the processor is further configured to execute the computer-readable instructions to create a recommendation for at least one of the one or more second user devices on at least one of a shooting location or a shooting angle at which a plurality of images associated with a place or an object is to be taken, the recommendation being provided based on the one or more pieces of the first primary content stored in the content database associated with the server.

16. The server of claim 15, wherein the processor is further configured to execute the computer-readable instructions to select the one or more second user devices based on the one or more project creation conditions to form a group uploading the one or more pieces of the second primary content and the second location information associated therewith in response to the processor setting the project based on the project setting request and the one or more project creation conditions inputted by the specific user.

17. The server of claim 15, wherein
the one or more pieces of the first primary content and the one or more pieces of the second primary content include the plurality of images associated with the place included in the project or the object designated by the project, the secondary content is at least one of a panoramic image, a three-dimensional (3D) image, or an animation image, and the processor is configured to execute the computer-readable instructions to create the secondary content by synchronizing the plurality of images.

18. The server of claim 15, wherein the processor is further configured to execute the computer-readable instructions to, select the one or more second user devices based on at least one of specific location information associated with each of the plurality of user devices, personal relationship among specific users of the plurality of user devices established through a service associated with the server, or the specific users communicating through a communication session in the service associated with the server, and transmit the project to the selected one or more second user devices in order to receive information for creating the secondary content.

19. The server of claim 15, wherein the one or more first user devices and the one or more second user devices have at least one user device in common.

* * * * *